United States Patent
Kohen

(10) Patent No.: US 11,133,632 B2
(45) Date of Patent: Sep. 28, 2021

(54) QUICK CONNECT DEVICE FOR RECESSED ELECTRICAL FIXTURES

(71) Applicant: Ran Roland Kohen, Aventura, FL (US)

(72) Inventor: Ran Roland Kohen, Aventura, FL (US)

( * ) Notice: Subject to any disclaimer, the term of this patent is extended or adjusted under 35 U.S.C. 154(b) by 121 days.

(21) Appl. No.: 16/492,460

(22) PCT Filed: Mar. 12, 2018

(86) PCT No.: PCT/US2018/021919
§ 371 (c)(1),
(2) Date: Sep. 9, 2019

(87) PCT Pub. No.: WO2018/165646
PCT Pub. Date: Sep. 13, 2018

(65) Prior Publication Data
US 2021/0143595 A1    May 13, 2021

Related U.S. Application Data

(60) Provisional application No. 62/470,170, filed on Mar. 10, 2017.

(51) Int. Cl.
| | |
|---|---|
| *H01K 1/00* | (2006.01) |
| *H01R 33/945* | (2006.01) |
| *H01R 13/717* | (2006.01) |
| *H01R 13/52* | (2006.01) |
| *H01R 13/512* | (2006.01) |

(Continued)

(52) U.S. Cl.
CPC ............ *H01R 33/945* (2013.01); *F21S 8/026* (2013.01); *F21V 21/03* (2013.01); *F21V 23/06* (2013.01); *H01R 13/512* (2013.01); *H01R 13/5213* (2013.01); *H01R 13/6276* (2013.01); *H01R 13/7175* (2013.01); *F21Y 2115/10* (2016.08)

(58) Field of Classification Search
CPC .... H01R 33/09; H01R 13/26; H01R 13/5216; H01R 13/521
USPC ...................... 439/617, 918, 699.2, 276, 936
See application file for complete search history.

(56) References Cited

U.S. PATENT DOCUMENTS

| | | |
|---|---|---|
| 484,911 A | 10/1892 | Green |
| 1,595,972 A | 8/1926 | DeReamer |

(Continued)

FOREIGN PATENT DOCUMENTS

| | | |
|---|---|---|
| CN | 1728475 A | 2/2006 |
| CN | ZL 01 8 23877.7 | 11/2007 |

(Continued)

OTHER PUBLICATIONS

International Search Report with Written Opinion dated Aug. 13, 2018 for PCT/US2018/030372.

(Continued)

*Primary Examiner* — Phuong Chi Thi Nguyen
(74) *Attorney, Agent, or Firm* — Paul D. Bianco; Gary S. Winer; Fleit Intellectual Property Law

(57) ABSTRACT

A plug and socket combination together with a light source for achieving the look and effect of a recessed lighting fixture with only a standard electrical junction box and without any type of recessed lighting housing. For renovations, a plug and socket combination can be used with an existing conventional recessed lighting housing.

18 Claims, 20 Drawing Sheets

(51) Int. Cl.
*F21V 23/06* (2006.01)
*F21S 8/02* (2006.01)
*F21V 21/03* (2006.01)
*H01R 13/627* (2006.01)
*F21Y 115/10* (2016.01)

(56) References Cited

U.S. PATENT DOCUMENTS

| | | |
|---|---|---|
| 1,897,954 A | 2/1933 | D'Olier |
| 2,077,587 A | 4/1937 | Rowe |
| 2,308,016 A | 1/1943 | Mihalyi |
| 2,313,481 A | 3/1943 | Rendano |
| 2,494,428 A | 1/1950 | Buck |
| 2,673,966 A | 3/1954 | Larkin |
| 2,726,372 A | 12/1955 | Appleton |
| 2,728,895 A | 12/1955 | Quackenbush |
| 2,863,037 A | 12/1958 | Johnstone |
| 3,056,035 A | 9/1962 | Berheim |
| 3,118,713 A | 1/1964 | Ellis |
| 3,159,444 A | 12/1964 | Stine |
| 3,193,636 A | 7/1965 | Daniels |
| 3,386,071 A | 5/1968 | Allen |
| 3,398,260 A | 8/1968 | Martens |
| 3,521,216 A | 7/1970 | Tolegian |
| 3,585,564 A | 6/1971 | Skjervoll |
| 3,648,002 A | 3/1972 | Du Rocher |
| 3,651,443 A | 3/1972 | Quilez |
| 3,668,603 A | 6/1972 | Burgess et al. |
| 3,798,584 A | 3/1974 | Person |
| 3,808,577 A | 4/1974 | Mathauser |
| 3,813,478 A | 5/1974 | Ervin |
| 3,855,564 A | 12/1974 | Dumas |
| 3,871,732 A | 3/1975 | Appleton |
| 4,059,327 A | 11/1977 | Vann |
| 4,079,244 A | 3/1978 | Bortoluzzi |
| 4,083,619 A | 4/1978 | McCormick et al. |
| 4,107,770 A | 8/1978 | Weber |
| 4,133,594 A | 1/1979 | Laverick et al. |
| 4,335,927 A | 6/1982 | Allen et al. |
| 4,448,388 A | 5/1984 | Dennis |
| 4,462,653 A | 7/1984 | Flederbach |
| 4,473,869 A | 9/1984 | De Widt |
| 4,588,248 A | 5/1986 | Moore |
| 4,629,843 A | 12/1986 | Kato et al. |
| 4,631,648 A | 12/1986 | Nilssen |
| 4,681,385 A | 7/1987 | Kruger et al. |
| 4,753,600 A | 6/1988 | Williams |
| 5,003,128 A | 3/1991 | Grondin |
| 5,034,869 A | 7/1991 | Choi |
| 5,173,053 A | 12/1992 | Swanson et al. |
| 5,250,874 A | 10/1993 | Hall et al. |
| 5,352,122 A | 10/1994 | Speyer |
| 5,362,122 A | 11/1994 | Reihl et al. |
| 5,438,216 A | 8/1995 | Juskey et al. |
| 5,442,532 A | 8/1995 | Boulos et al. |
| 5,442,632 A | 8/1995 | Boulos et al. |
| 5,494,325 A | 2/1996 | Liu et al. |
| 5,494,326 A | 2/1996 | Hinds |
| 5,536,685 A | 7/1996 | Burward-Hoy |
| 5,551,882 A | 9/1996 | Whiteman |
| 5,562,458 A | 10/1996 | Stora et al. |
| 5,584,726 A | 12/1996 | Le Gallic |
| 5,600,537 A | 2/1997 | Gordin |
| 5,622,873 A | 4/1997 | Kim et al. |
| 5,668,920 A | 9/1997 | Pelonis |
| 5,710,541 A | 1/1998 | Stanley |
| 5,754,408 A | 5/1998 | Derouiche |
| 5,777,391 A | 7/1998 | Nakamura et al. |
| 5,790,381 A | 8/1998 | Derouiche et al. |
| 5,803,590 A | 9/1998 | Wedell et al. |
| 5,808,556 A | 9/1998 | Nelson |
| 5,836,781 A | 11/1998 | Hyzin |
| 5,952,714 A | 9/1999 | Sano et al. |
| 5,962,810 A | 10/1999 | Glenn |
| 6,064,155 A | 5/2000 | Maya |
| 6,068,490 A | 5/2000 | Salzberg |
| 6,093,029 A | 7/2000 | Kwon et al. |
| 6,129,598 A | 10/2000 | Yu et al. |
| 6,135,800 A | 10/2000 | Majors |
| 6,170,967 B1 | 1/2001 | Usher et al. |
| 6,175,159 B1 | 1/2001 | Sasaki |
| 6,240,247 B1 | 5/2001 | Reiker |
| 6,241,559 B1 | 6/2001 | Taylor |
| 6,332,794 B1 | 12/2001 | Tzeng Jeng |
| 6,340,790 B1 | 1/2002 | Gordin et al. |
| 6,364,716 B1 | 4/2002 | Sea |
| 6,366,733 B1 | 4/2002 | Reiker |
| 6,398,392 B2 | 6/2002 | Gordin et al. |
| 6,422,722 B1 | 7/2002 | Voltolina |
| 6,517,223 B2 | 2/2003 | Hsu |
| 6,595,782 B1 | 7/2003 | Hsiao |
| 6,598,990 B2 | 7/2003 | Li |
| 6,631,243 B2 | 10/2003 | Reiker |
| 6,648,488 B1 | 11/2003 | Pearce |
| 6,751,406 B2 | 6/2004 | Reiker |
| 6,793,383 B2 | 9/2004 | Wu |
| 6,821,089 B2 | 11/2004 | Bilskie |
| 6,837,754 B1 | 1/2005 | Walton |
| 6,962,498 B2 | 11/2005 | Kohen |
| 7,001,199 B2 | 2/2006 | Badalpour |
| 7,052,301 B2 | 5/2006 | Garcia et al. |
| 7,066,739 B2 | 6/2006 | McLeish |
| 7,192,303 B2 | 3/2007 | Kohen |
| 7,462,066 B2 | 12/2008 | Kohen |
| 7,467,881 B2 | 12/2008 | McMillen |
| 7,569,710 B1 | 8/2009 | Ozero |
| 7,706,757 B2 | 4/2010 | Luglio et al. |
| 7,723,862 B1 | 5/2010 | Spillman et al. |
| 7,878,691 B2 | 2/2011 | Liang |
| 8,123,378 B1 | 2/2012 | Ruberg et al. |
| 8,186,852 B2 | 5/2012 | Dassanayake et al. |
| 8,192,057 B2 | 6/2012 | Dassanayake et al. |
| 8,277,082 B2 | 10/2012 | Dassanayake et al. |
| 8,348,678 B2 | 1/2013 | Hardisty |
| 8,354,768 B2 | 1/2013 | Cipriani |
| 8,357,016 B2 | 1/2013 | Schumacher |
| 8,419,218 B2 | 4/2013 | Dassanayake et al. |
| 8,449,137 B2 | 5/2013 | Dassanayake et al. |
| 8,558,413 B1 | 10/2013 | Lepard |
| D693,765 S | 11/2013 | Workman |
| 8,702,435 B2 | 4/2014 | Tajima |
| 8,894,247 B2 | 11/2014 | Kim et al. |
| 8,979,347 B2 | 3/2015 | Holman |
| 9,328,910 B2 | 5/2016 | Lin et al. |
| 9,605,811 B2 * | 3/2017 | Wang .................... F21V 23/005 |
| 9,644,824 B2 | 5/2017 | Dassanayake et al. |
| 9,702,535 B2 | 7/2017 | Dassanayake et al. |
| 9,901,039 B1 | 2/2018 | Dellerson et al. |
| 9,903,576 B2 | 2/2018 | Creasman et al. |
| 10,020,626 B1 * | 7/2018 | Hung .................... F21V 23/06 |
| 10,208,977 B2 | 2/2019 | Bhide |
| 10,317,015 B2 | 6/2019 | Joye |
| 10,326,247 B2 | 6/2019 | Kohen |
| 10,794,546 B2 * | 10/2020 | Wang .................... F21K 9/232 |
| 10,845,046 B2 | 11/2020 | Kohen |
| 10,900,617 B2 * | 1/2021 | Wang .................... F21K 9/238 |
| 2002/0060369 A1 | 5/2002 | Akram |
| 2002/0064380 A1 | 5/2002 | Reiker |
| 2002/0081107 A1 | 6/2002 | Reiker |
| 2003/0012027 A1 | 1/2003 | Hsu |
| 2003/0107891 A1 | 6/2003 | Kohen |
| 2004/0192415 A1 | 9/2004 | Luglio et al. |
| 2005/0148241 A1 | 7/2005 | Kohen |
| 2006/0044789 A1 | 3/2006 | Curtis |
| 2006/0141842 A1 | 6/2006 | Sauer |
| 2006/0146527 A1 | 7/2006 | Vanderschuit |
| 2007/0105414 A1 | 5/2007 | Kohen |
| 2007/0167072 A1 | 7/2007 | Kohen |
| 2007/0258202 A1 | 11/2007 | Cooley et al. |
| 2008/0146064 A1 | 6/2008 | Bankstahl |
| 2009/0035970 A1 | 2/2009 | Kohen |
| 2009/0111322 A1 | 4/2009 | Roland |
| 2009/0129974 A1 | 5/2009 | McEllen |
| 2009/0280673 A1 | 11/2009 | Kohen |

(56) References Cited

U.S. PATENT DOCUMENTS

| | | |
|---|---|---|
| 2010/0020550 A1 | 1/2010 | Kawashima |
| 2010/0214775 A1 | 8/2010 | Liang |
| 2010/0295473 A1 | 11/2010 | Chemel et al. |
| 2010/0301769 A1 | 12/2010 | Chemel et al. |
| 2011/0060701 A1 | 3/2011 | Verfuerth et al. |
| 2011/0134239 A1 | 6/2011 | Vadai et al. |
| 2012/0196471 A1 | 8/2012 | Guo |
| 2013/0040471 A1 | 2/2013 | Gervais et al. |
| 2013/0107536 A1 | 5/2013 | Hiraoka |
| 2014/0168944 A1 | 6/2014 | Osada et al. |
| 2014/0211487 A1 | 7/2014 | Spiro |
| 2014/0225731 A1 | 8/2014 | Gouveia |
| 2014/0263903 A1 | 9/2014 | Ostrobrod |
| 2014/0268790 A1 | 9/2014 | Chobot et al. |
| 2015/0009666 A1 | 1/2015 | Keng et al. |
| 2015/0009676 A1 | 1/2015 | Danesh |
| 2015/0044040 A1 | 2/2015 | Oda et al. |
| 2015/0085500 A1 | 3/2015 | Cooper |
| 2016/0053952 A1 | 2/2016 | Kuti et al. |
| 2016/0069556 A1 | 3/2016 | Li |
| 2016/0123374 A1 | 5/2016 | Roberts |
| 2016/0131358 A1 | 5/2016 | Spiro |
| 2016/0255697 A1 | 9/2016 | Bhide |
| 2017/0105265 A1 | 4/2017 | Sadwick |
| 2017/0234319 A1 | 8/2017 | Seccareccia |
| 2017/0248148 A1 | 8/2017 | Kohen |
| 2018/0115131 A1 | 4/2018 | Kohen |
| 2019/0312396 A1 | 10/2019 | Kohen |
| 2020/0018469 A1 | 1/2020 | Kohen |
| 2020/0144766 A1 | 5/2020 | Kohen |

FOREIGN PATENT DOCUMENTS

| | | |
|---|---|---|
| CN | 10195268 A | 12/2007 |
| CN | 101095268 A | 12/2007 |
| CN | 102483213 A | 5/2012 |
| CN | 102870307 A | 1/2013 |
| CN | 104033399 A | 9/2014 |
| CN | 203934061 U | 11/2014 |
| CN | 204879746 U | 12/2015 |
| CN | 1582518 A | 2/2016 |
| CN | 105674223 A | 6/2016 |
| CN | 107211515 A | 9/2017 |
| DE | 19849101 A1 | 4/1999 |
| DE | 29923352 U1 | 8/2000 |
| DE | 20203467 U1 | 6/2002 |
| EP | 0704934 A2 | 4/1996 |
| EP | 1024559 A2 | 8/2000 |
| EP | 1456914 A1 | 9/2004 |
| EP | 1789984 A2 | 5/2007 |
| EP | 3295525 A1 | 5/2016 |
| IL | 126246 | 8/2001 |
| JP | 2008166071 A | 7/2008 |
| JP | 53311043 B2 | 10/2013 |
| RU | 2011122686 | 10/2012 |
| RU | 2526853 | 8/2014 |
| WO | 00/16442 | 3/2000 |
| WO | 01/01047 A1 | 1/2001 |
| WO | 03/044906 A1 | 5/2003 |
| WO | 2005053100 A2 | 6/2005 |
| WO | 2005/074087 A1 | 8/2005 |
| WO | 2006031853 A2 | 3/2006 |
| WO | 2006/060772 A2 | 6/2006 |
| WO | 2006060772 A2 | 6/2006 |
| WO | 2011005526 A2 | 1/2011 |
| WO | 2011/020231 A1 | 2/2011 |
| WO | 2011/134709 A2 | 3/2011 |
| WO | 2011/134709 A2 | 11/2011 |
| WO | 2012/167320 A1 | 12/2012 |
| WO | 2016054159 A1 | 4/2016 |
| WO | 2016/144795 A1 | 9/2016 |
| WO | 2016/183354 | 11/2016 |
| WO | 2016/183354 A1 | 11/2016 |
| WO | 2016183354 A1 | 11/2016 |
| WO | 2018/165646 | 9/2018 |
| WO | 2018/165058 | 10/2018 |
| WO | 2018/195068 | 10/2018 |

OTHER PUBLICATIONS

Office Action dated Sep. 25, 2018 from Chinese Patent Office for Application No. 201580063483.2.
Office Action for U.S. Appl. No. 15/515,664, dated Sep. 10, 2019.
International Preliminary Report on Patentability dated Sep. 10, 2019 for PCT/US2018/020987, filed Mar. 5, 2018.
International Search Report dated Jul. 6, 2018 for PCT/US2018/027956 filed Apr. 17, 2018.
Written Opinion dated Jul. 6, 2018 for PCT/US2018/027956 filed Apr. 17, 2018.
International Search Report dated May 17, 2018 for PCT/US2018/021919 filed Mar. 12, 2018.
Written Opinion for PCT/US2018/021919 filed Mar. 12, 2018.
International Preliminary Report on Patentability dated Sep. 10, 2019 for PCT/US2018/021919.
International Search Report dated Aug. 13, 2018 for PCT/US2018/030372 filed May 1, 2018.
Written Opinion dated Aug. 13, 2018 for PCT/US2018/030372 filed May 1, 2018.
International Preliminary Report on Patentability dated Oct. 22, 2019 for PCT/US2018/027956.
Response filed Jan. 17, 2019, in U.S. Appl. No. 15/573,606.
European Search Report for Application No. 16793548.5 dated Feb. 14, 2019.
International Search Report and Written Opinion for PCT/US2018/21919 filed Mar. 12, 2018 (047).
International Search Report and Written Opinion for PCT/US2018/20987 filed Mar. 5, 2018.
European Search Report dated Jul. 3, 2018 for Application No. 15846948.6.
For U.S. Appl. No. 16/605,994: Notice of Allowance dated Jun. 29, 2020.
First Examination Report dated Jun. 2, 2020 for Indian Patent No. 201717042509 filed Nov. 27, 2017.
International Preliminary Report on Patentability dated Nov. 14, 2017 for International Application No. PCT/US2016/032170 filed May 12, 2016.
Notice of Allowance dated Jul. 8, 2020 for U.S. Appl. No. 16/609,875.
International Preliminary Report on Patentability dated Sep. 10, 2019 with Written Opinion for PCT/US2018/021919, filed Mar. 12, 2018.
Final Office Action for U.S. Appl. No. 15/515,664, dated Mar. 10, 2020.
Office Action for U.S. Appl. No. 16/443,207, dated Mar. 11, 2020.
First Office Action dated Sep. 2, 2020 for Chinese Application No. 201880030051.5 with translation of cover page (12 pages).
Response to First Examination Report, filed Sep. 4, 2020 for Indian Patent Application No. 201717013438, National Stage of PCT/US2015/053138.
Office Action dated Aug. 3, 2020, for European Patent Application No. 16793548.5 (Regional Stage of PCT/US2016/032170).
Notice of Allowance dated Feb. 2, 2021 for U.S. Appl. No. 16/443,207 61 pages.
First Notification of Office Action dated Nov. 19, 2020, for Chinese Application No. 2018800333913, National Stage of PCT/US2018/027956 10 pages (with partial English translation).
First Office Action dated Dec. 23, 2020, for Israeli Patent Application No. 255549, National Stage of PCT/US2016/32170 7 pages.
Office Action dated Jan. 27, 2021, for U.S. Appl. No. 15/515,664, filed Mar. 30, 2017, 67 pages.
For Russian Patent Application 2017142137 (national stage of PCT/US2016/032170): Prosecution history including decision to grant dated Oct. 25, 2019.
Office Action issued by the European Patent Office dated Dec. 19, 2019 for Application No. 16 793 548.5-1201.
European Search Report dated Oct. 21, 2020 for EP 18764255.8.

(56) References Cited

OTHER PUBLICATIONS

For Brazilian Patent Application No. BR 11 2017 024224-9 (National Stage of PCT/US2016/032170): Response filed Oct. 14, 2020.
International Search Report with Written Opinion dated Jul. 6, 2018 for PCT/US2018/027956.
Office Action dated Sep. 18, 2018 in U.S. Appl. No. 15/573,606.
First Office Action dated Oct. 23, 2020 for Chinese Application No. 2018800402400.
International Search Report dated May 25, 2020 for PCT/US2020/019010 filed Feb. 20, 2020.
Written Opinion dated May 25, 2020 for PCT/US2020/019010 filed Feb. 20, 2020.
IAEI, When continuity snaps, May-Jun. 2015.
IAEI, Supports reinforce our safety, Hanging Support Systems, Mar.-Apr. 2015.
Office Action for U.S. Appl. No. 16/491,321, dated Apr. 21, 2020.
International Preliminary Report on Patentability dated Nov. 5, 2019 br International Application No. PCT/US2018/030372 filed May 1, 2018, 6 pages.
Written Opinion for International Application No. PCT/US2018/030372 filed May 1, 2018, 5 pages.
For Chinese Patent Application No. 201580063483.2 (national stage of PCT/US2015/053138): Third Office Action, dated Sep. 18, 2019 (with English translation) Response to Third Office Action, dated Dec. 2, 2019 (13 pages).
For Chinese Patent Application No. 201580063483.2 (national stage of PCT/US2015/053138): Response to First Office Action, dated Feb. 11, 2019 (9 pages) Response to Second Office Action, dated Aug. 26, 2019 (12 pages).
For Russian Patent Application No. 2016800404661 (national stage of PCT/US2016/032170): Second Office Action, dated Dec. 2, 2019 (3 pags) Search Report, dated Nov. 24, 2019 (2 pages).
For Indian Patent Application No. 201717013438 (National Stage of PCT/US2015/053138): First Examination Report, dated Dec. 13, 2019 (6 pages).
International Search Report dated Jul. 18, 2016 for International Application No. PCT/US2016/032170 filed May 12, 2016.
Written Opinion for for International Application No. PCT/US2016/032170 filed May 12, 2016.
International Search Report, Written Opinion, International Preliminary Report on Patentability for PCT/US2004/039399 filed Nov. 22, 2004.
International Search Report, Written Opinion, International Preliminary Report on Patentability for PCT/US2005/032661 filed Sep. 14, 2005.
International Search Report, Written Opinion, International Preliminary Report on Patentability for PCT/US2005/043934 filed Dec. 2, 2005.
International Search Report, Written Opinion, International Preliminary Report on Patentability for PCT/US2015/53138 filed Sep. 30, 2015.
International Search Report and Written Opinion for PCT/US2016/32170 filed May 12, 2016.
European Search Report for EP05796234 dated Nov. 5, 2007 (realted to WO2006031853).
International Search Report for PCT/IL01/01078 filed Nov. 22, 2001.
Second Office Action for Chinese Patent Application No. 201580063483.2, dated Jun. 14, 2019 (with translation of cover page).
Publication issued in the Official Gazette from Mexican Patent Application MX/a/2017/004137 dated Feb. 13, 2018, 3 pages.
Chinese Search Report dated Feb. 18, 2019 for Patent Application No. 2016800404661.
First Office Action dated Feb. 27, 2019 from Chinese Patent Office for Patent Application No. 201680040466.1.
International Search Report for PCT/IL99/00499 filed Sep. 14, 1999.
European Search Report for EP 01 27 4757 dated Mar. 28, 2006.
Australian Examiner's First Report on Patent Application AU 2002221000.
Indian First Examination Report dated Jun. 24, 2010 for Indian Application No. 1677/KOLNP/2006.
New Zealand Examination Report for NZ Patent Application No. 533697 dated May 9, 2007.
For Chinese Patent Application No. 01823877.7: Notice of Allowance dated Oct. 17, 2006 Second Office Action dated Apr. 6, 2007 First Office Action dated Jul. 4, 2006.
First Office Action dated Sep. 2, 2020 for Chinese Application No. 201880030051.5 (9 pages).
Translation of cover page for First Office Action dated Sep. 2, 2020 for Chinese Application No. 201880030051.5, 3 pages.
English translation of Search Report from Chinese Patent Office for Application No. 201580063483.2 dated Sep. 11, 2018.
Office Action from Chinese Patent Office for Application No. 201580063483.2 dated Sep. 25, 2018 (with English translation).
First Office Action dated Aug. 13, 2020 for Chinese Application No. 2018800295358.
Search Report dated Aug. 7, 2020 for Chinese Application No. 2018800295358.

* cited by examiner

QUICK CONNECT DEVICE FOR RECESSED ELECTRICAL FIXTURES

RELATED PATENTS AND APPLICATIONS

This disclosure relates to PCT International Patent Application No. PCT/US2016/032170 filed May 12, 2016 (published as WO 2016/183354 A1); PCT International Patent Application No. PCT/US2018/020987 filed Mar. 5, 2018; U.S. Pat. No. 7,462,066 filed Mar. 20, 2007; U.S. Pat. No. 7,192,303 filed Dec. 2, 2004; and U.S. Pat. No. 6,962,498 filed Dec. 12, 2001; and to U.S. Patent Application Publication No. 20090280673 filed Dec. 2, 2005; U.S. Provisional Application 62/160,585 filed May 12, 2015; and U.S. Provisional Application 62/308,718, filed Mar. 15, 2016, the contents of all of which are hereby incorporated by reference herein, in their entirety.

FIELD OF THE DISCLOSURE

The disclosure relates to electrical connectors and fixtures, and more particularly, to an electrical plug and socket combination allowing quick connection and mounting of electrical fixtures for recessed lighting.

BACKGROUND OF THE DISCLOSURE

Traditional techniques for installing electrical fixtures and appliances such as lighting fixtures and fans on walls or ceilings usually require the assistance of a qualified electrician, and the use of a variety of tools and specialized hardware. The procedure for installing or uninstalling such fixtures can also be relatively time consuming, even when performed by an experienced installer. In addition to the need for hand-wiring the necessary electrical connections between the fixture and electrical power supply wiring, the installer must make separate mechanical connections for supporting or suspending the fixture in place.

The patents identified above in the Related Patents and Applications Section disclose solutions to these and other problems. These related patents and applications disclose various embodiments of plug and socket combinations that permit quick connection of an electrical fixture or appliance at an electrical junction box on a wall or ceiling. The socket is secured on the wall or ceiling near electrical power supply wiring and includes female receptacles which receive male electrical prongs carried on the plug. The electrical fixture is secured to the plug. In addition to the quick electrical connection provided by this plug and socket combination, a mechanical connection between the plug and socket carries the mechanical load of the electrical fixture.

This disclosure sets forth improvements related to various embodiments of the plug and socket combinations in the related patents and applications for use when recessed lighting is desired.

Recessed lighting is a versatile means of providing both ambient and task lighting to just about any area in home, office, or any desired space. Also known as pot lighting, can lighting, or downlights, these lights are mounted in the ceiling or wall (most often in a ceiling) rather than surface mounted on the wall or ceiling.

Recessed lighting includes two major components—the housing and the trim, both chosen (and oftentimes sold) separately. The housing is what's above the ceiling, and it contains all of the electrical components, such as the light source and the means to mount the fixture. The trim refers to what we see below the ceiling, such as the trim style or the parts that direct the light.

Besides functional differences in the wide variety of recessed lighting options commercially available, there are aesthetic ones too. If the look of a round, white light fixture, is not appealing for a given application, there are other choices available. Recessed lights with trim rings in different colors or metallic finishes are available. Square lights as well as different shapes and sizes are available if the round-style is too plain or conventional.

SUMMARY OF THE DISCLOSURE

The disclosure relates to a device for connecting an electrical fixture with electrical power supply wiring located at or near an electrical junction box positioned such that a face of the electrical junction box is substantially flush with a surface, and for mounting the fixture on the electrical junction box. The device includes a socket including a socket body having at least one internal cavity therein. The socket is configured and dimensioned to be positioned in the electrical junction box and securable to the electrical junction box. An electrically conductive contact terminal is disposed within the cavity for establishing an electrical connection between the electrical power supply wiring and the socket.

The device also includes a plug fixed to the fixture and insertable into the socket. The plug has at least one male connector electrically connected to the fixture and engageable with the contact terminal within the socket to establish a circuit between the electrical fixture and the electrical power wiring. A releasable latch is carried on the combination of the plug and the socket for releasably securing the plug to the socket. The plug and socket are configured and dimensioned such that the fixture is positioned against the surface without a recessed lighting housing.

In one embodiment, the fixture is a LED PCB light source. The LED PCB can include a cover. A rim can be provided on the cover. In an embodiment, the body of the cover is transparent or translucent and the rim is opaque. The cover can include a lens, filter, or other optical element to create a lighting effect.

In some embodiments, the light source and cover both have a flat profile. In other embodiments, at least one of the light source and cover has a domed profile.

The socket can include a mounting strap attached to the socket body for securing the socket to the electrical junction box. In an embodiment, the mounting strap is generally U-shaped with two legs. In one embodiment, the length of the legs is at least twice the height of the socket body. In another embodiment, the length of the legs is about the same as the height of the socket body. In a different embodiment, the length of the legs is adjustable.

The electrical junction box can include a first series of vertically spaced holes and a second series of vertically spaced holes, with the first and second series of vertically spaced holes on facing surfaces of the electrical junction box.

The disclosure also relates to a plug for coupling with a socket to form a device for connecting an electrical fixture with electrical power supply wiring located at or near an electrical junction box positioned such that a face of the electrical junction box is substantially flush with a surface, and for mounting the fixture on the electrical junction box.

The plug comprises at least one male connector electrically connected to the fixture and engageable with a contact terminal within the socket to establish a circuit between the electrical fixture and the electrical power wiring. A releasable latch is carried on the combination of the plug and the socket for releasably mounting the fixture on the support. The plug and socket are configured and dimensioned such that the fixture is positioned against the surface without a recessed lighting housing.

The disclosure also relates to a socket for a recessed lighting housing to mechanically and electrically couple an electrical fixture fixed to a plug. The socket comprises: an extender having an Edison type base on a first end and a socket body on a second end, the Edison type base threadably connectable to threading of housing to mechanically and electrical couple the socket to the housing; and a socket body on a second end of the extender, the socket body having at least one internal cavity therein and an electrically conductive contact terminal disposed within the cavity for establishing an electrical connection between the housing and the socket. A releasable latch is carried on the combination of the plug and the socket for releasably securing the plug to the socket.

In one embodiment, the extender has a fixed length. In another embodiment, the extender has an adjustable length.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings (which form an integral part of the description and are to be read in conjunction therewith, and in which like reference numerals are employed to designate identical components in the various views) wherein.

DETAILED DESCRIPTION

As required, embodiments are disclosed herein; however, it is to be understood that the disclosed embodiments are merely examples and that the devices and methods described below can be embodied in various forms. Therefore, specific structural and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The disclosure herein relates to the inventor's prior work, such as that set forth above in the documents identified in the Related Patents and Applications section, the contents of each of which are herein incorporated in their entirety by reference. In this regard, the plug and/or socket can include a sensing unit for at least one of wirelessly communicating a sensed condition and wirelessly receiving a signal as disclosed in PCT International Patent Application No. PCT/US2016/032170 filed May 12, 2016 and PCT International Patent Application No. PCT/US2018/020987 filed Mar. 5, 2018.

Figure 1:
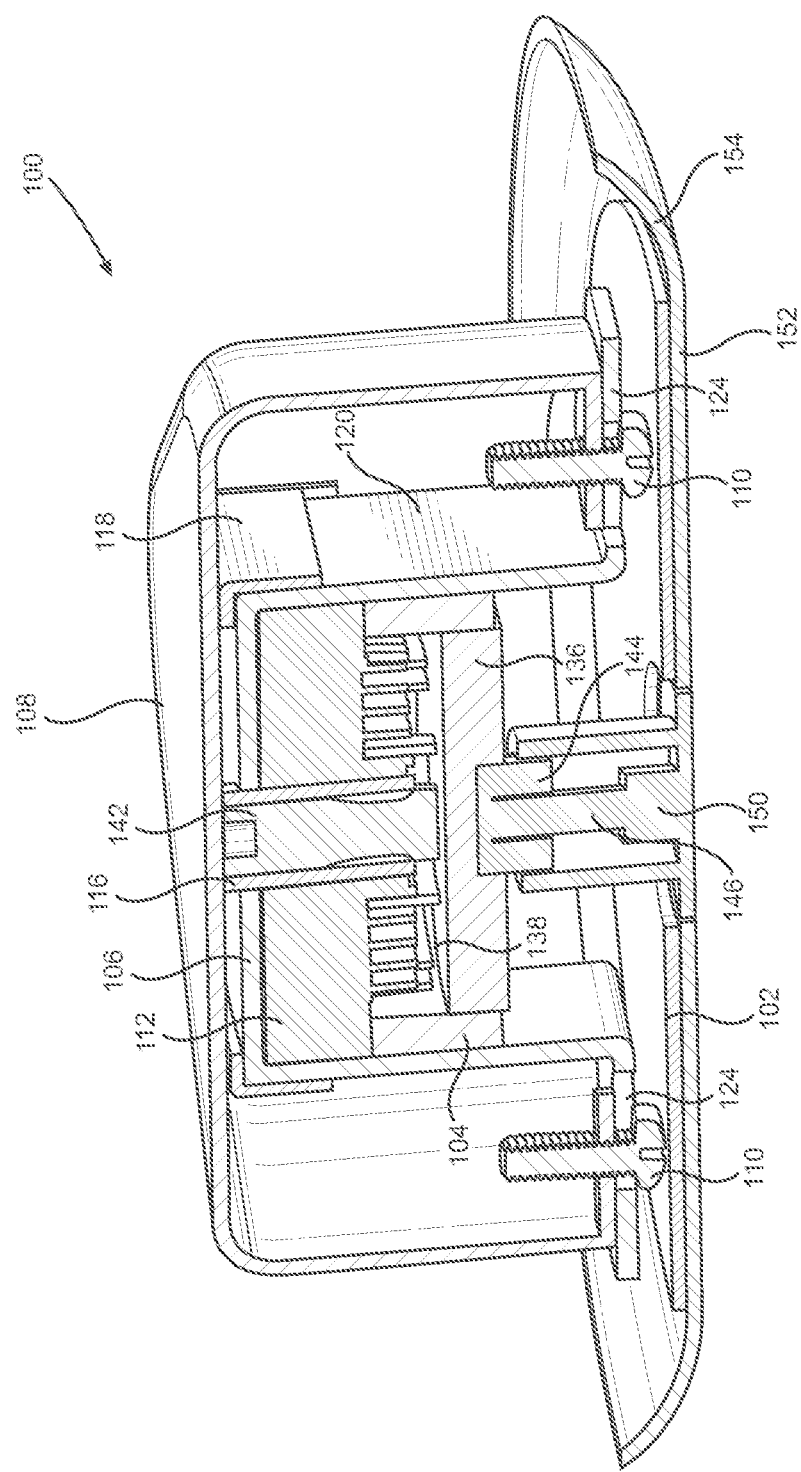
FIG. 1 is a sectional view of an embodiment of a recessed lighting plug and socket (receptacle) of a quick connect device according to the disclosure. The socket is installed in an electrical junction box and the plug is mechanically and electrically connected to the socket.
Figure 2:
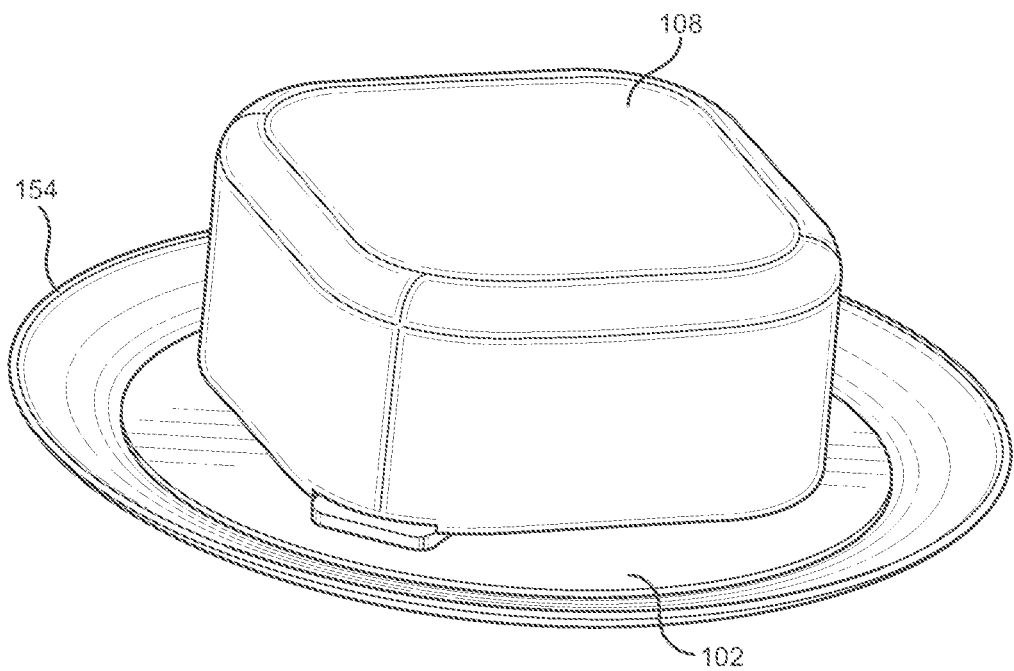
FIG. 2 is a front perspective view of the recessed lighting plug and socket of FIG. 1.
Figure 3:
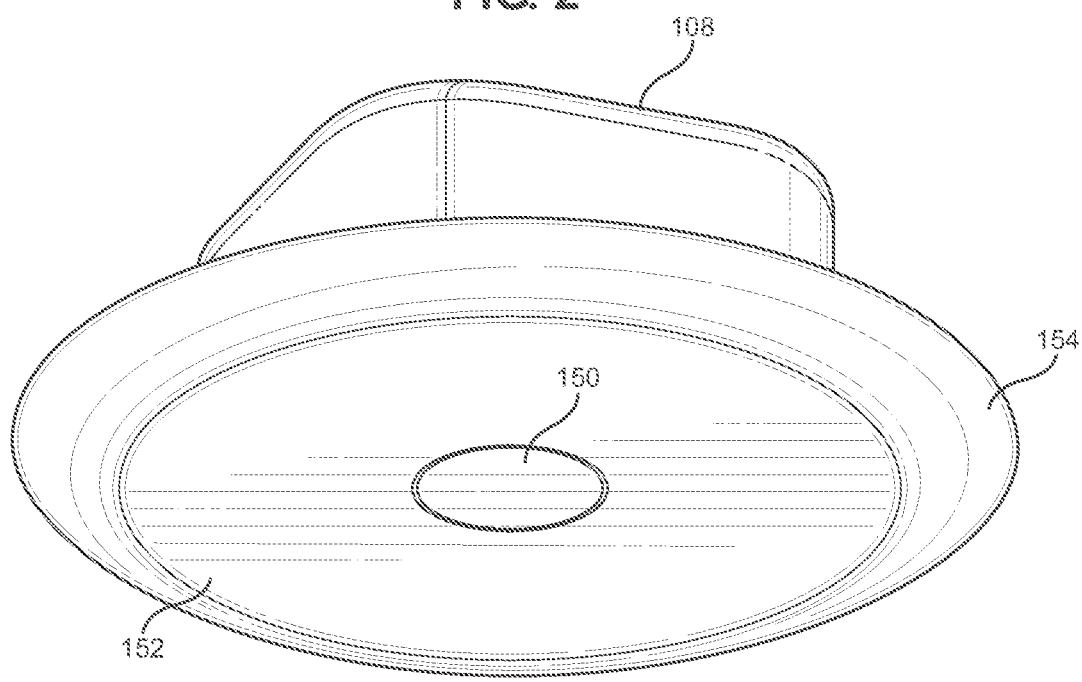
FIG. 3 is a back perspective view of the recessed lighting plug and socket of FIG. 1.
Figure 4:
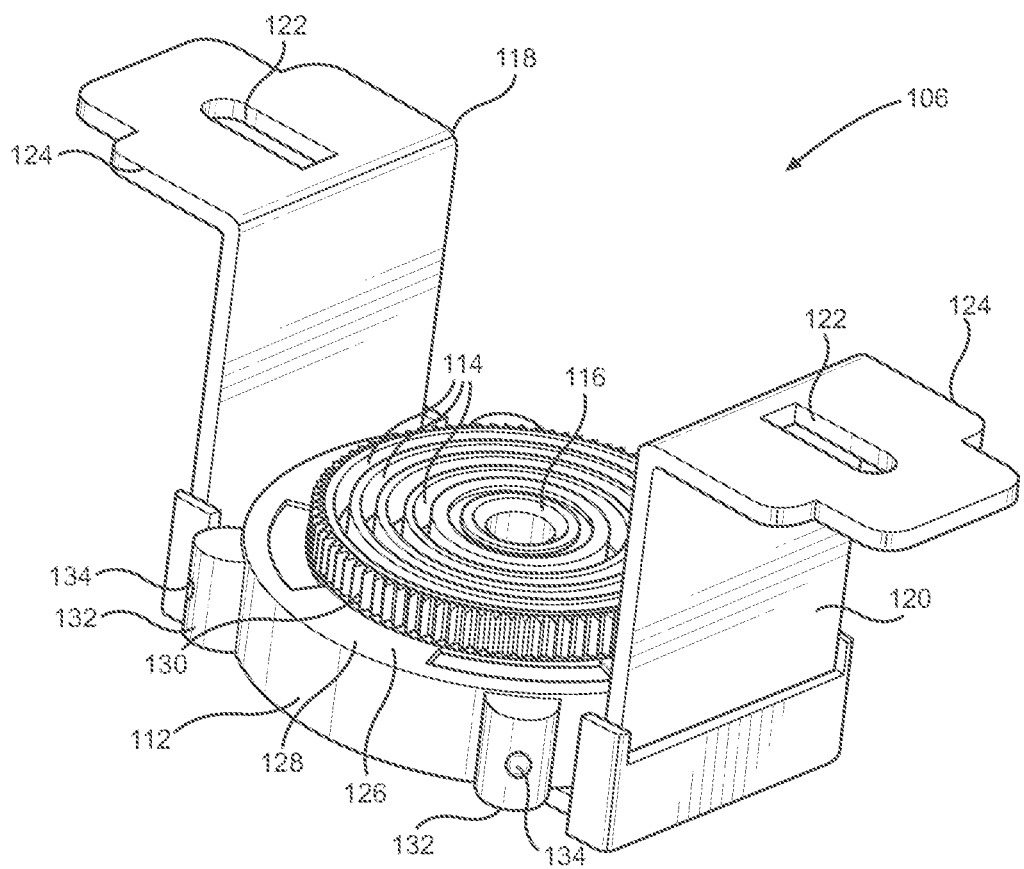
FIG. 4 is a perspective view of the socket of FIG. 1 prior to installation in the electrical junction box.
Figure 5:
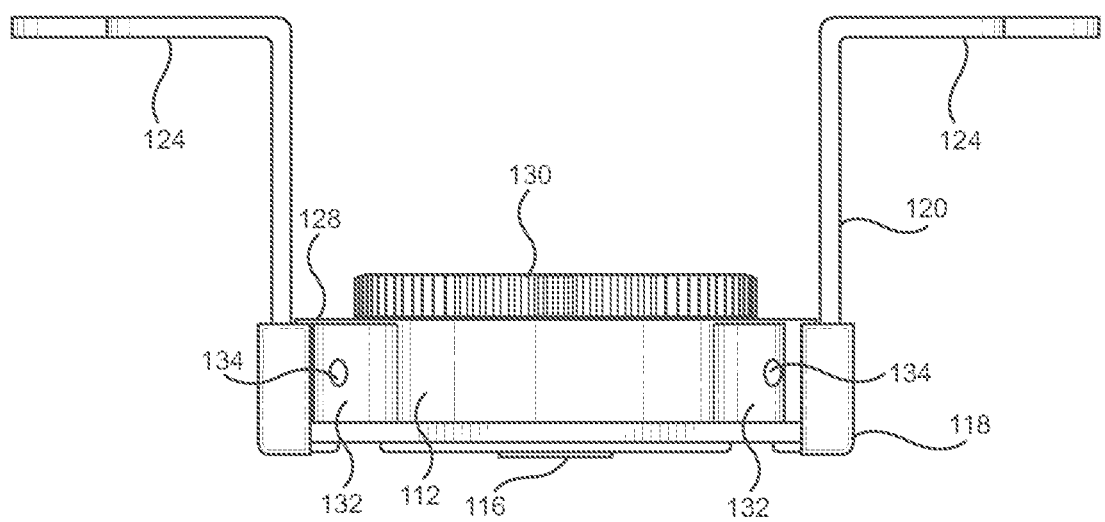
FIG. 5 is a side view of the socket of FIG. 1 prior to installation in the electrical junction box.
Figure 6:
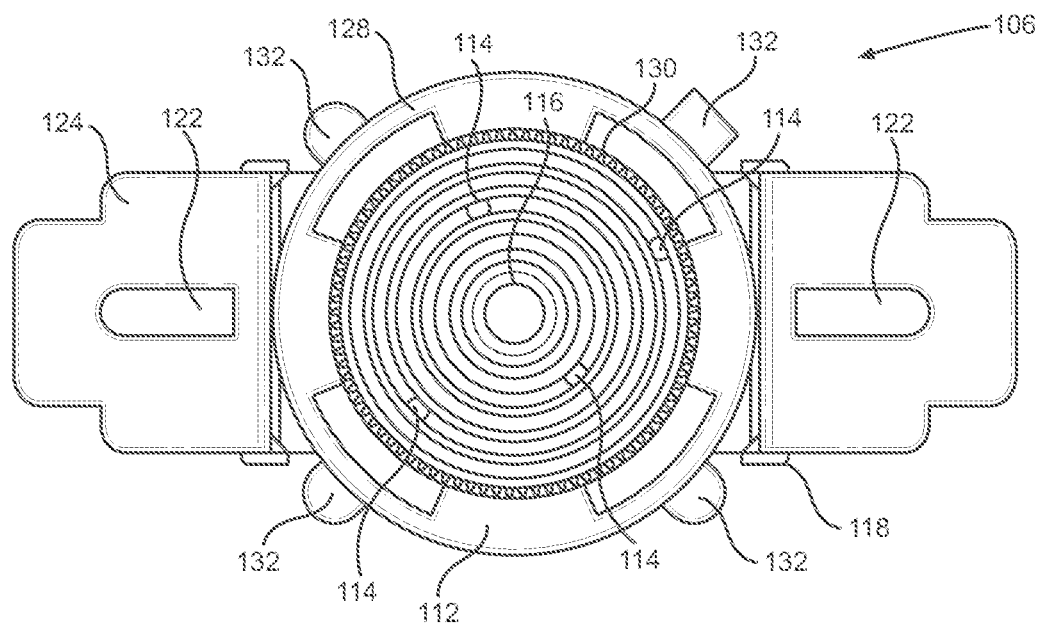
FIG. 6 is a front view of the socket of FIG. 1 prior to installation in the electrical junction box.
Figure 7:
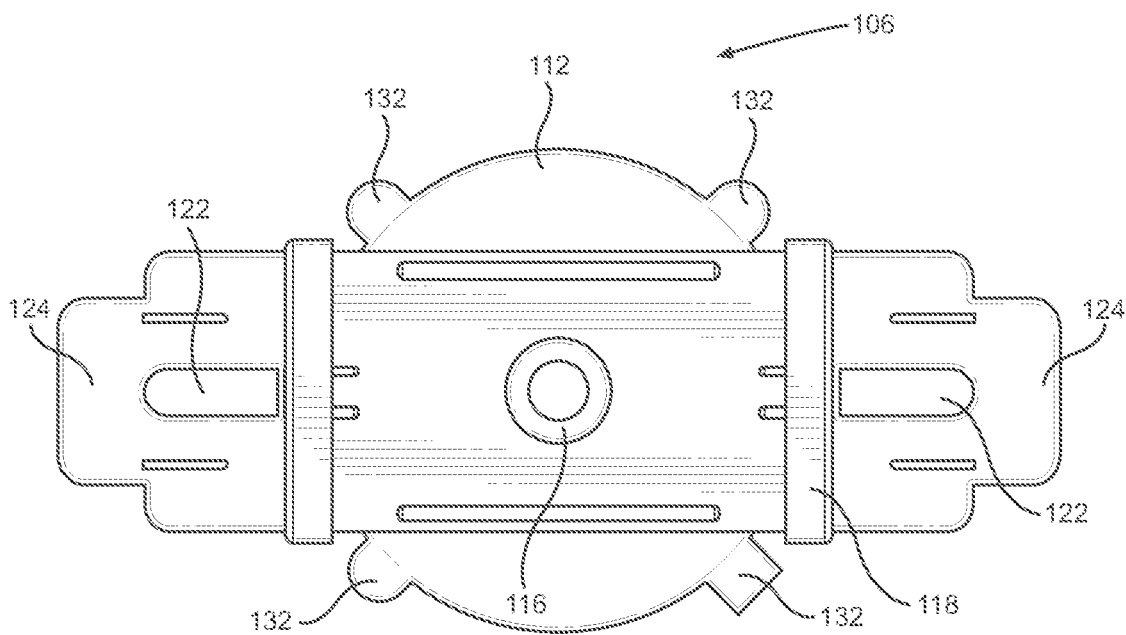
FIG. 7 is a back view of the socket of FIG. 1 prior to installation in the electrical junction box.

Referring first to FIGS. 1-3, a quick connect device 100 for installing electrical fixtures, which in this embodiment is a light source 102, comprises the combination of a plug 104 and mating socket 106. Plug 104 and socket 106 are configured and dimensioned so that together with light source 102, the look and effect of a recessed lighting fixture are achieved with only a standard electrical junction box and without any type of recessed lighting housing. The disclosure contemplates that electrical fixtures other than a light source can be used with device 100. Such fixtures or electrical fixtures include, but are not limited to, a camera, security device or any other device which is powered by electricity supplied by electrical wiring, and which requires a mechanical connection to support or suspend the fixture.

Device 100 functions to both establish an electrical connection between lighting source 102 and electrical supply wiring (located at or near electrical junction box 108), and mechanically support lighting source 102 in electrical junction box 108 located on a surface or base, typically the ceiling, but could also be a wall or floor surface. Plug 104 is fixedly secured to lighting source 102, while socket 106 is secured to electrical junction box 108 with screws 110. Although lighting source 102 is shown as an LED PCB, the disclosure contemplates the use on any suitable lighting source.

Unless otherwise shown or described herein, the structure, function, and operation of plug 104 and mating socket 106 have already been detailed in, for example, the patents and application incorporated by reference herein. Accordingly, this disclosure will focus on the differences in structure, function, and operation of plug 104 and mating socket 106 as well as other related improvements.

As best seen in FIGS. 4-10, socket 106 comprises a substantially cylindrically shaped body 112 formed of non-conductive material such as phenolic resin. Concentric, ring shaped, female recesses or slots 114 are formed in one face of socket 106, and are configured to matingly receive later discussed male connector rings on plug 104 to establish electrical connections between plug 104 and socket 106. Socket 106 includes a center through hole within which there is fixedly secured a bushing 116. In the illustrated embodiment, bushing 116 passes through and is fixedly secured to an elongate mounting strap 118 as by welding. It should be noted here however, that bushing 116 and strap 118 could be of unitary construction, formed of a single piece of high strength material, such as metal as by casting, machining or other metal working processes.

Figure 8:
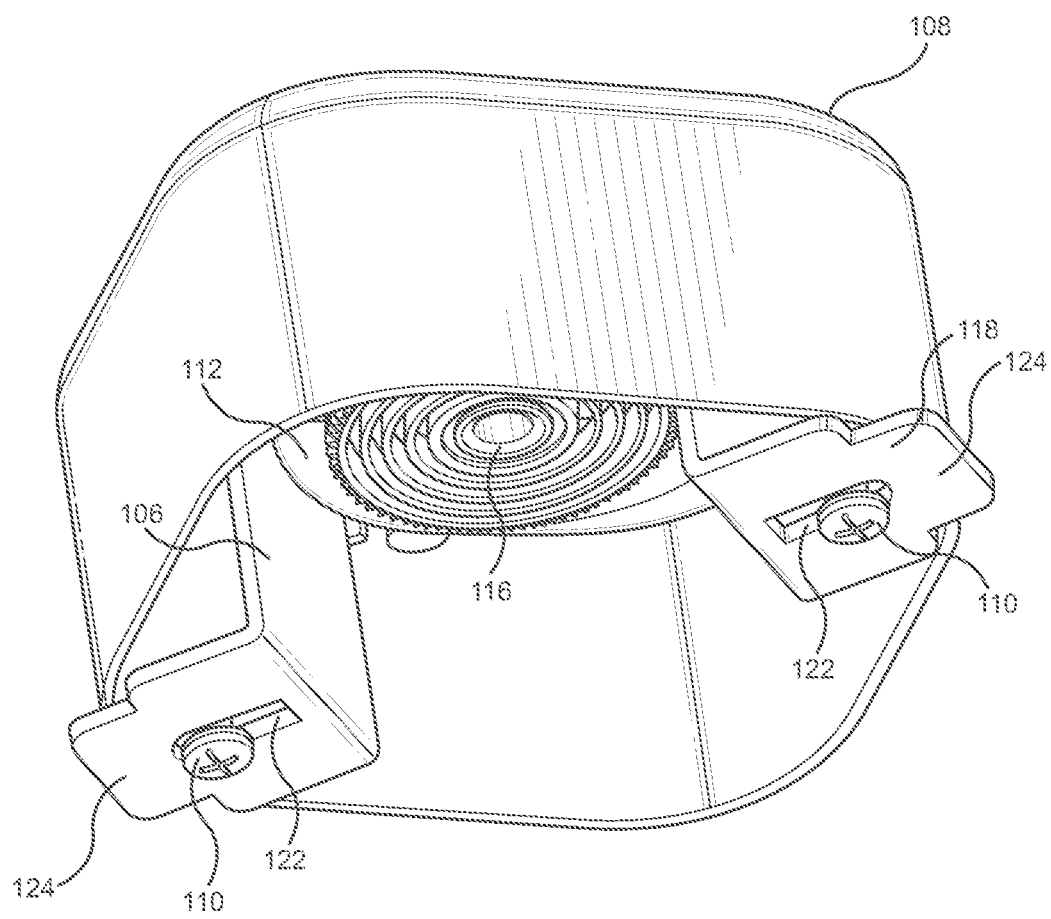
FIG. 8 is perspective view of the socket of FIG. 1 installed in an electrical junction box.
Figure 9:
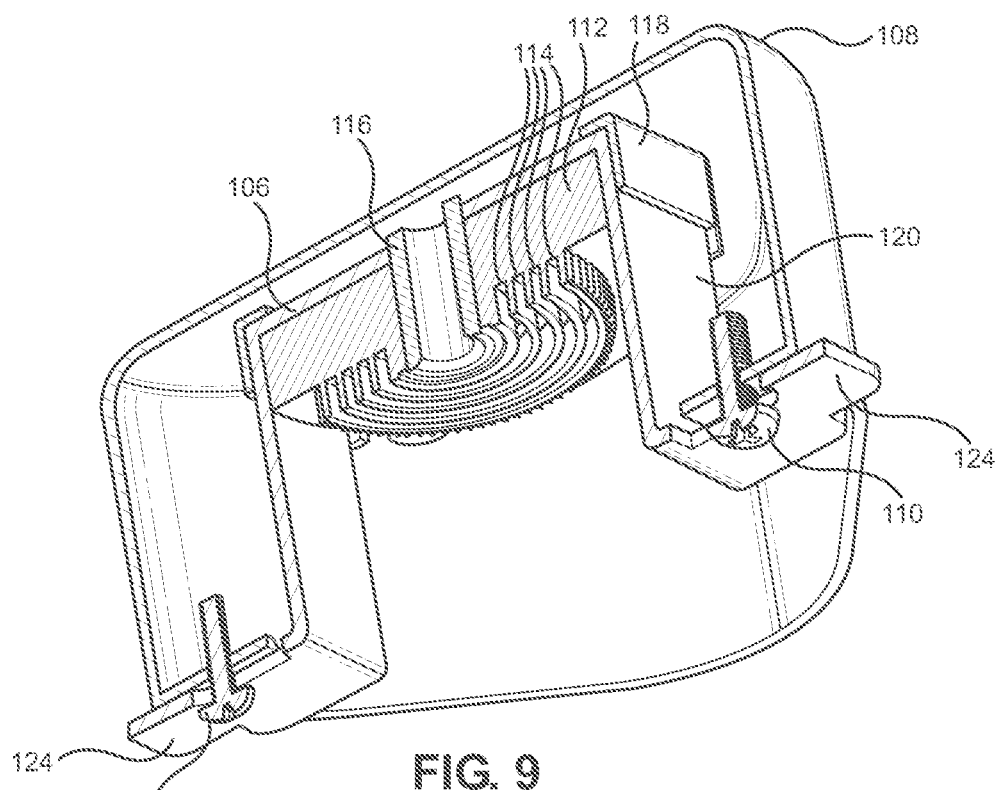
FIG. 9 is sectional view of the socket of FIG. 1 installed in an electrical junction box.
Figure 10:
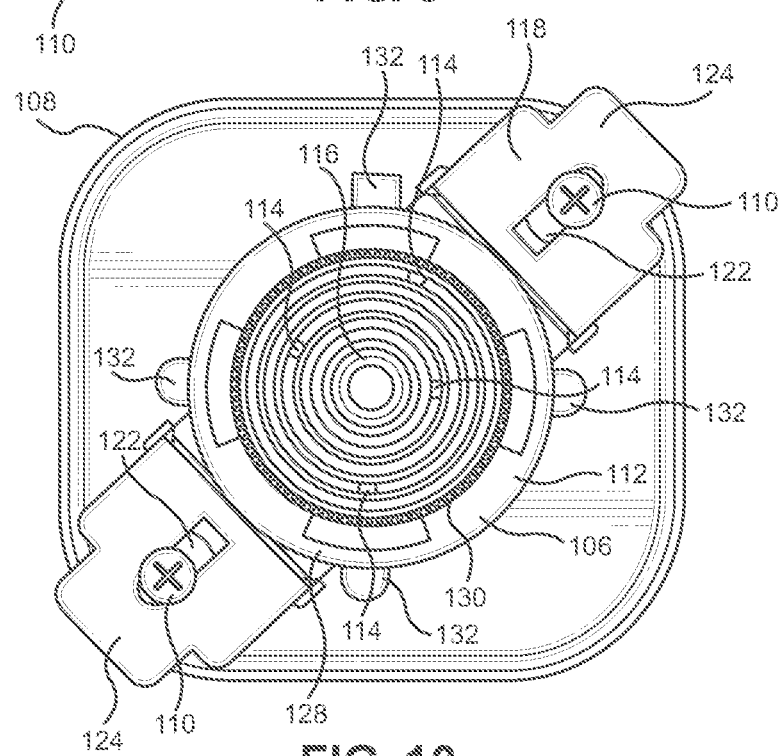
FIG. 10 is front view of the socket of FIG. 1 installed in an electrical junction box.
Figure 11:
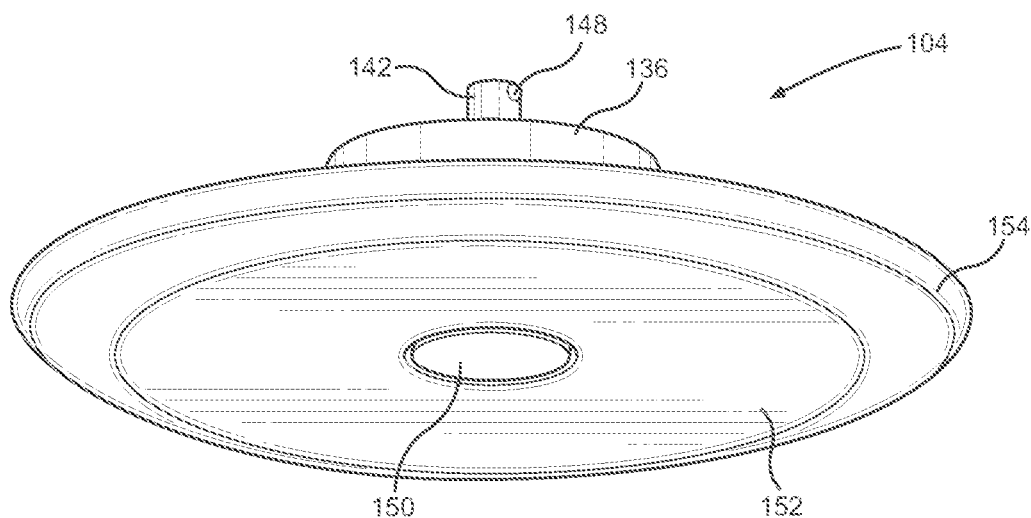
FIG. 11 is a perspective view of the plug of FIG. 1.
Figure 12:
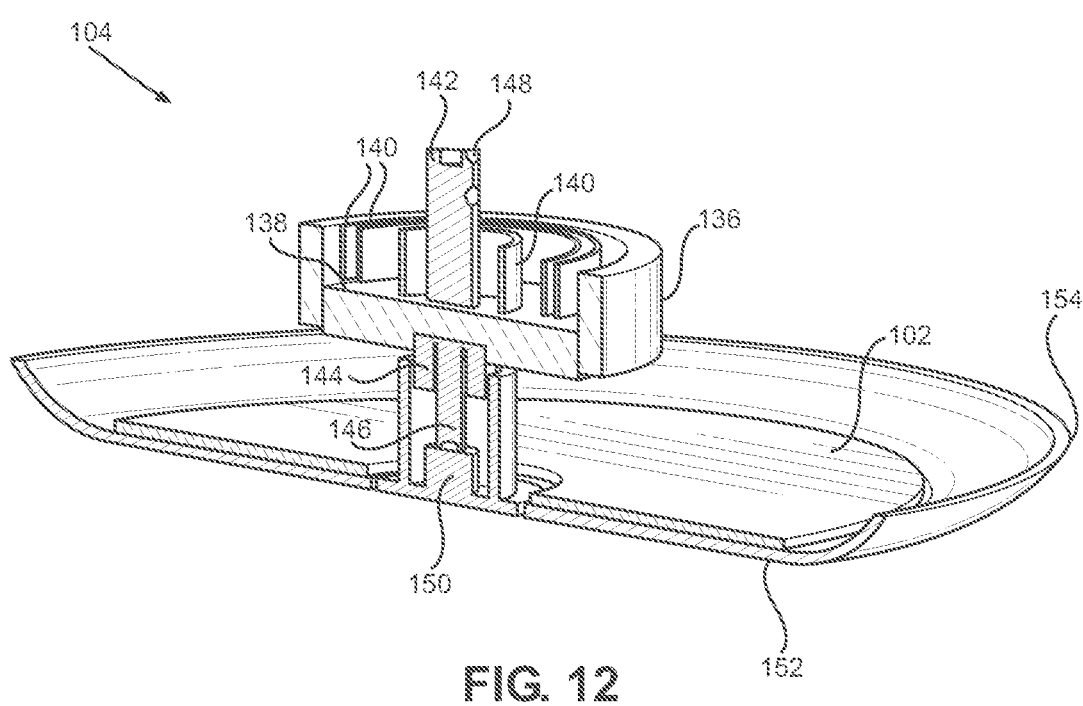
FIG. 12 is a sectional view of the plug of FIG. 1.
Figure 13:
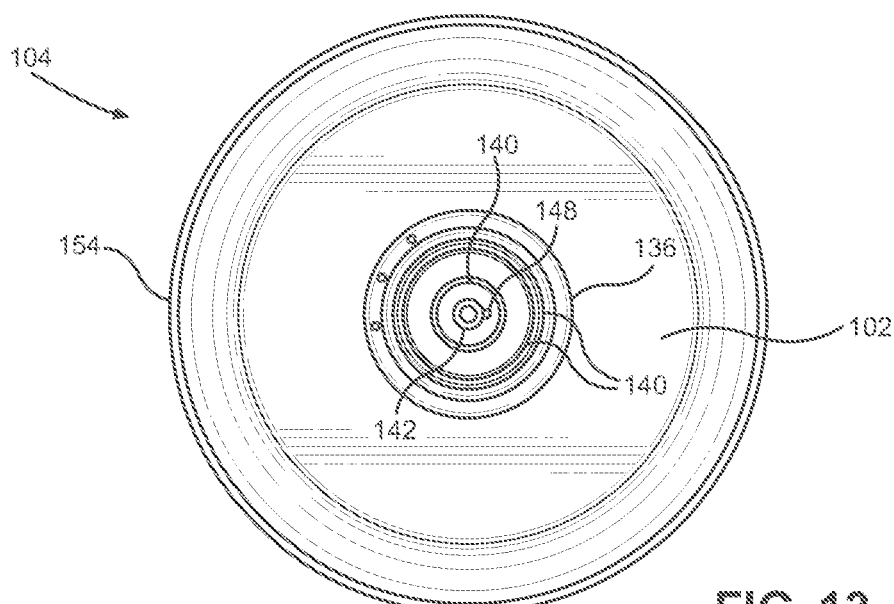
FIG. 13 is a back view of the plug of FIG. 1.
Figure 14:
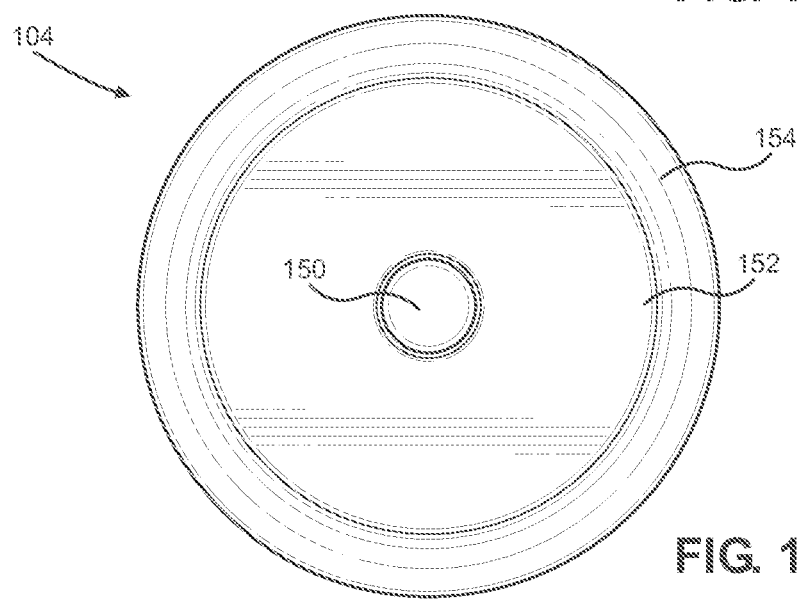
FIG. 14 is a front view of the plug of FIG. 1.
Figure 15:
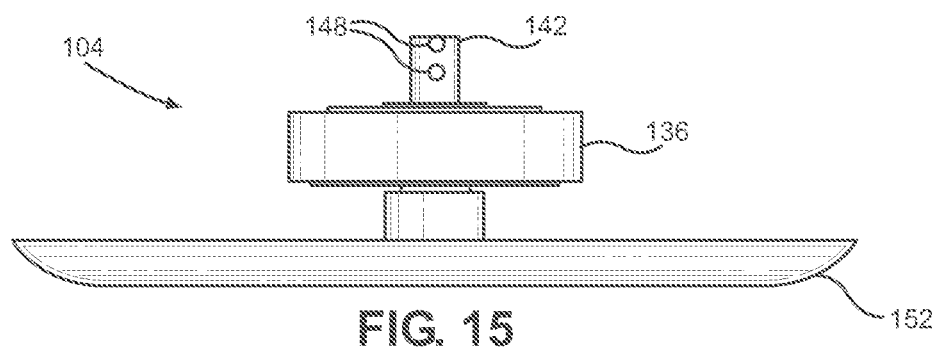
FIG. 15 is a side view of the plug of FIG. 1.
Figure 16:
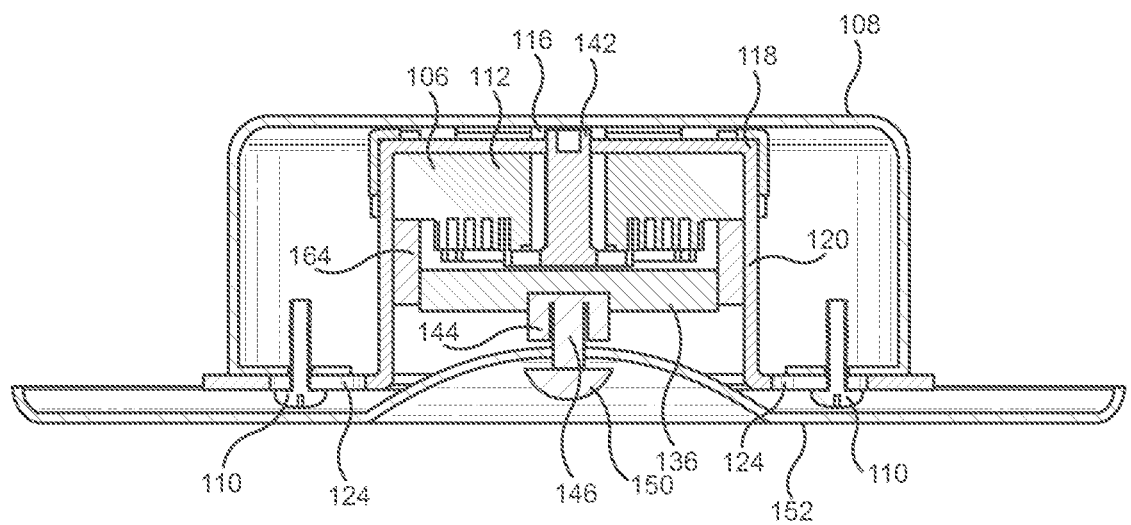
FIG. 16 is a sectional view of another embodiment of a recessed lighting plug and socket (receptacle) of a quick connect device according to the disclosure. The socket is installed in an electrical junction box and the plug is mechanically and electrically connected to the socket.
Figure 17:
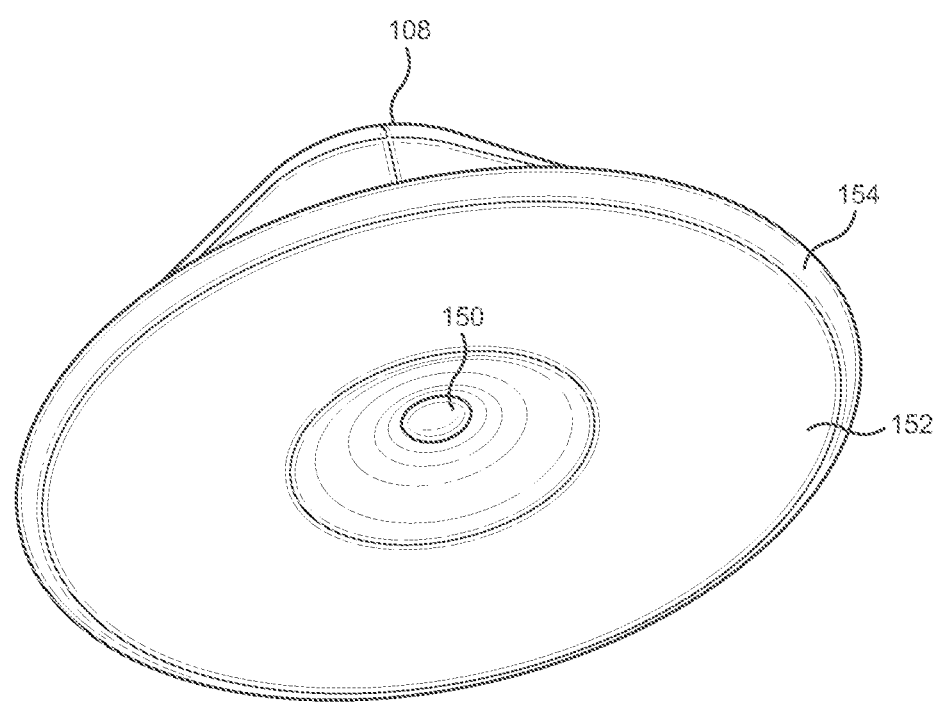
FIG. 17 is a perspective view of the recessed lighting plug and socket of FIG. 16.
Figure 18:
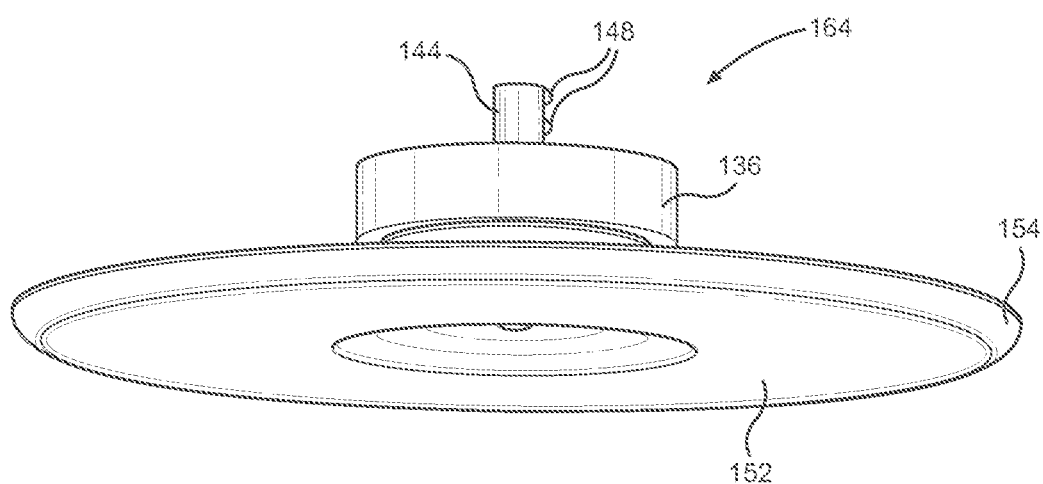
FIG. 18 is a perspective view of the plug of FIG. 16.
Figure 19:
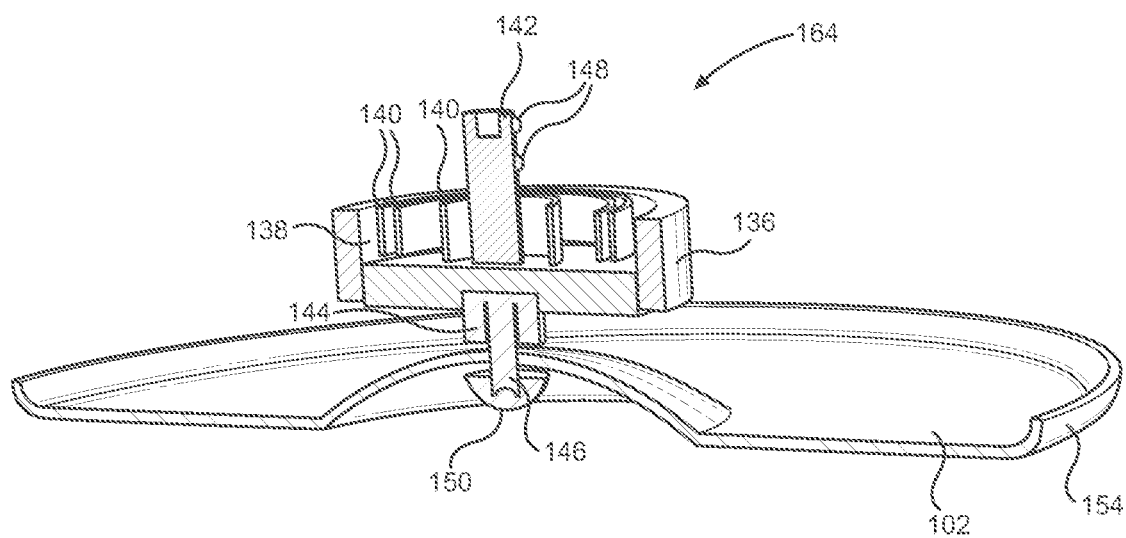
FIG. 19 is a sectional view of the plug of FIG. 16.
Figure 20:
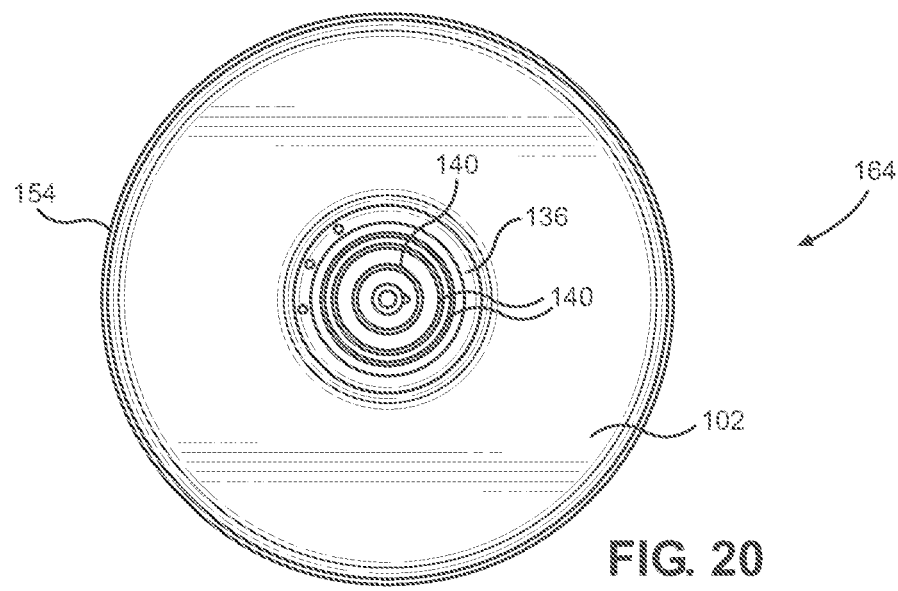
FIG. 20 is a back view of the plug of FIG. 16.
Figure 21:
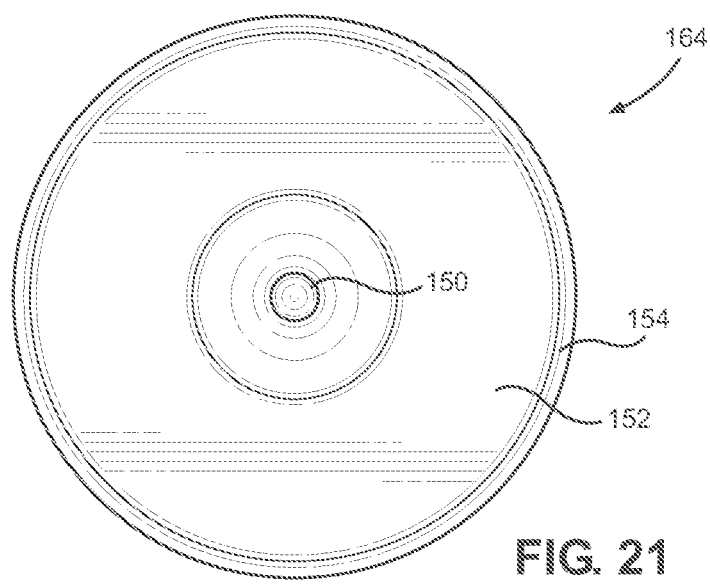
FIG. 21 is a front view of the plug of FIG. 16.
Figure 22:
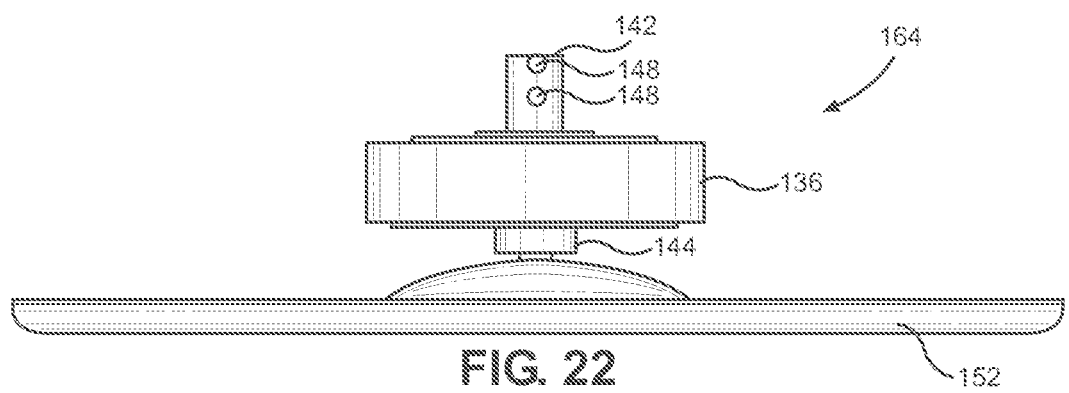
FIG. 22 is a side view of the plug of FIG. 16.
Figure 23:
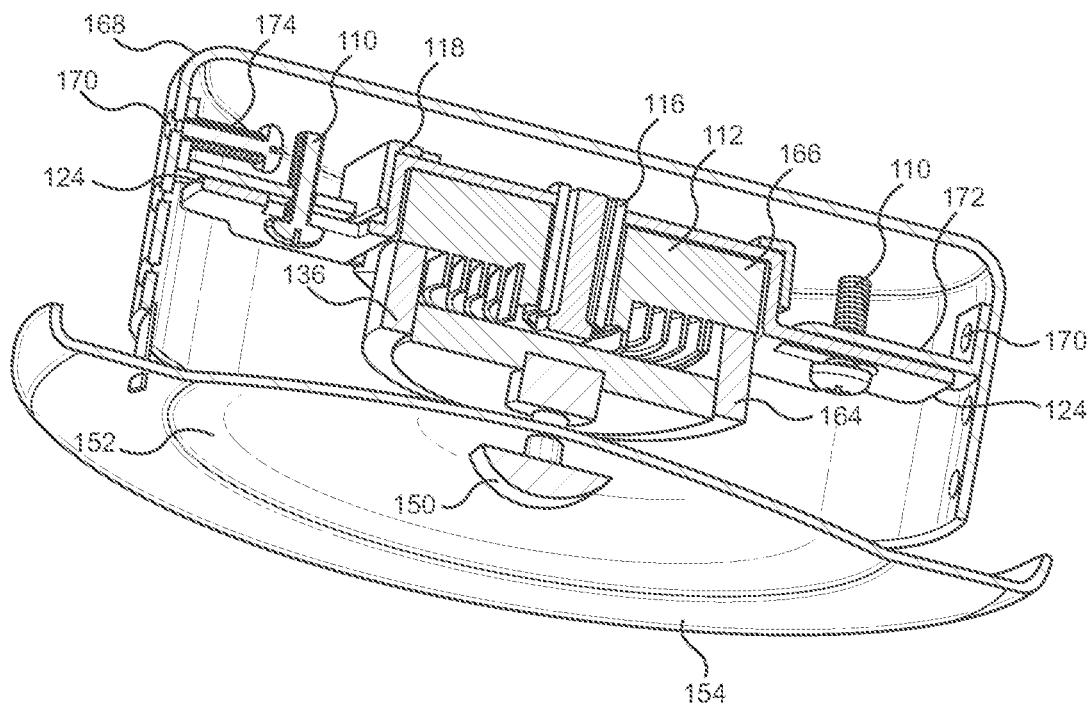
FIG. 23 is a sectional view of another embodiment of a recessed lighting plug and socket (receptacle) of a quick connect device according to the disclosure. The socket is installed in an electrical junction box and the plug is mechanically and electrically connected to the socket.
Figure 24:
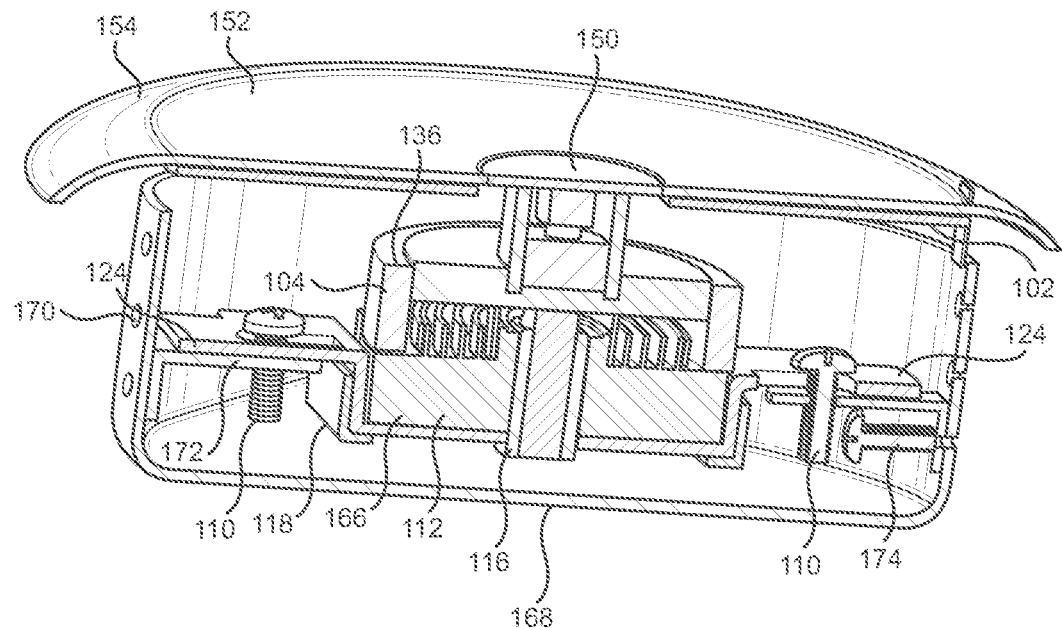
FIG. 24 is another sectional view of the recessed lighting plug and socket of FIG. 23.
Figure 25:
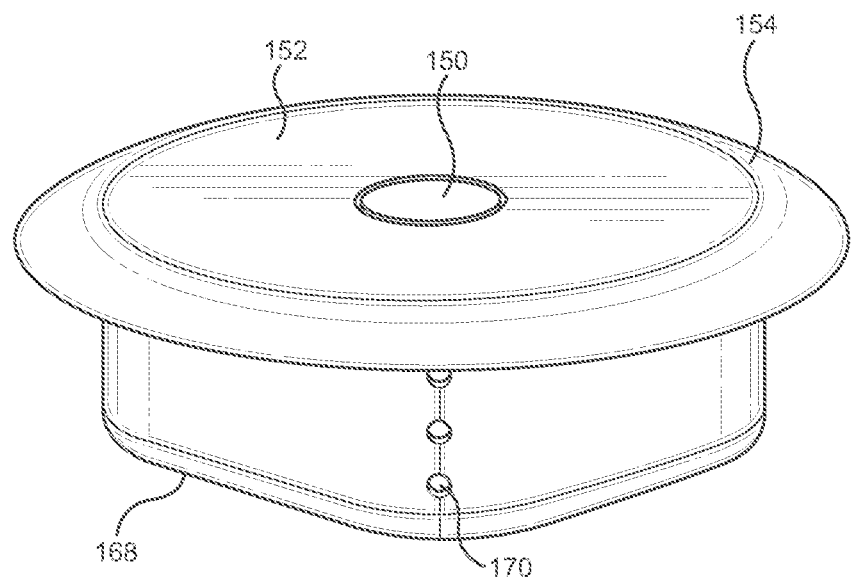
FIG. 25 is a front perspective view of the recessed lighting plug and socket of FIG. 23.
Figure 26:
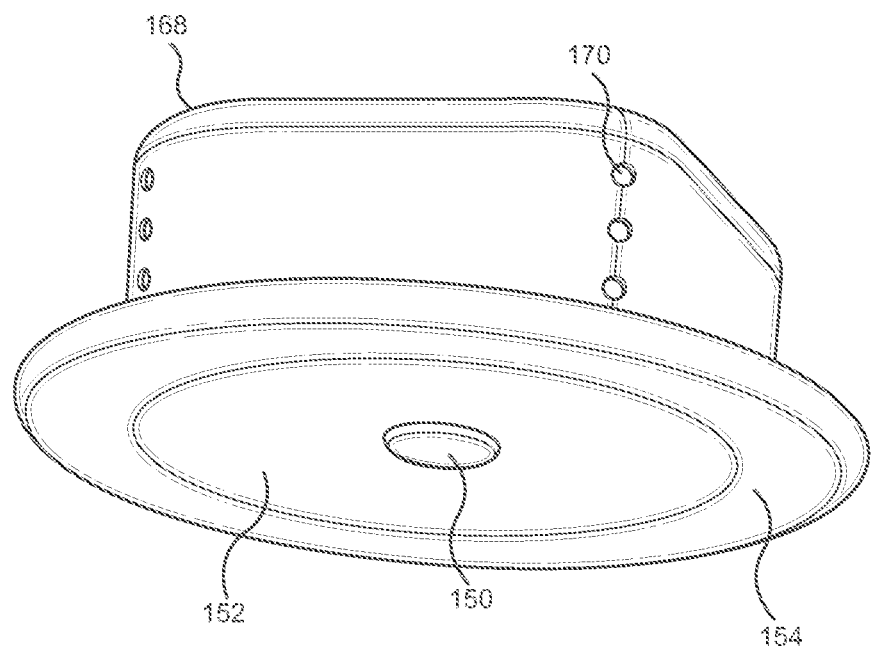
FIG. 26 is a back perspective view of the recessed lighting plug and socket of FIG. 23.

Mounting strap 118 is generally U-shaped with a length 120 selected (e.g. at least twice the height of socket body 112) so that lighting source 102 creates the look and effect of a recessed lighting fixture when installed in electrical junction box 108. Mounting strap 118 is provided with an aperture 122 on each of its outer extremities or flanges 124 which receives screw 100 to affix mounting strap 118, and thus the entire device 100 to electrical junction box 108. The U-shaped configuration of strap 118 allows socket 24 to be recessed within the junction box, as illustrated in FIGS. 8-10.

Socket body 112 is provided with a circumferential notch 126 defining an annular face 128 that is intended to engage a later discussed, corresponding face on plug 104 and acts as a stop to limit the entry of plug 104 into socket 106. Plug 104 and socket 106 are provided with a plurality of teeth 130 (on a face and/or periphery) that interengage or mesh when plug 104 and socket 106 are mated to prevent rotating relative to each other. Prior to the teeth 130 of the plug 104 and socket 106 engaging, plug 104 and socket 106 are free to rotate relative to each other.

Socket body 112 includes tabs 132, with each of tabs 132 having an opening 134 for receiving an electrical supply wire. The exact size of openings 134 will depend on the gauge of the electrical wiring in a given application. The bare, stripped end of the electrical supply wire is connected to socket 106 by inserting the wire end into one of the openings 134. Each of tabs 132 is electrically connected to a corresponding one of recesses 114 as disclosed in the patent documents incorporated by reference. Although tabs 132 are shown on the side of body 112, in some applications, it may be more convenient or possible to feed the electrical supply wires through the top face of socket body 12. In this case, the electrical supply wires may be positioned through access openings located on the top of socket body 112, where again they establish electrical connection to socket 106.

Referring now to FIGS. 11-15, plug 104 includes a body 136 formed out of non-conductive material and includes a cylindrical cavity 138 in one face thereof. Concentric, male connector rings 140 are integrally molded into plug body 136, with sufficient radial spacing therebetween to electrically insulate them from each other. The diameters and spacing of male connector rings 140 are such that they are alignable with and receivable within corresponding female recesses 114 in socket 106. Each of connector rings 140 includes an extension and electrical wiring from lighting source 102 which is attached to plug 104 and electrically connected to the extensions to provide power to lighting source 102.

Plug 104, as well as lighting source 102 attached thereto, is mechanically connected to socket 106 and to mounting strap 118 by means of a centrally located, releasable spindle assembly 142 which has been described in detail in the incorporated by reference patent documents. In brief, spindle assembly 142 includes a barrel 144 having a series of coaxial bores therein, and a plunger or pin 146 axially slidable within barrel 144. Barrel 144 includes a plurality of retaining balls 148 captured within radial openings in barrel 144. The upper end of pin 146 is provided with a reduced diameter section forming a recess or ball detent into which retaining balls 148 may be inwardly displaced. A compression spring sleeved over pin 146 normally biases pin 146 to move downwardly (outwardly) into a latched or locking position, wherein pin 146 forces retaining balls 148 outwardly until they rest against a shoulder within bushing 116. A push button 150, which extends from the lower end of barrel 144, provides a means of actuating spindle assembly 142 using either a finger or a tool.

Lighting source 102 may be secured to plug 104 in any of a variety of ways. For example, lighting source 102 may be fixedly attached to lower section of barrel 144. As shown, lighting source 102 rests on cover 152, which is attached to barrel 144. In any event, it may be appreciated that the weight of lighting source 102 is transmitted through barrel 144, retaining balls 148, and bushing 116 to mounting strap 118, which in turn is secured to electrical junction box 108.

Cover 152 can be provided with a rim 154 to create the look of a trim found in a recessed lighting fixture. Cover 152 can be clear plastic or glass to allow the illumination of lighting source 102 to be transmitted. Cover 152 can be or include a lens, filter, or other optical element to create a desired lighting effect.

FIGS. 16-22 show another embodiment of a plug 164 that can be used with socket 106 and electrical junction box 108. Since the embodiment of plug 164 is generally similar to the embodiment of plug 104, the same reference numerals are used to designate similar or analogous components to avoid confusion. Instead of having a flat profile like plug 104, plug 164 has a domed profile. It should be noted that the profile can be selected or changed based on the profile of lighting source 102 and/or cover 152.

FIGS. 23-26 show another embodiment of a socket 166 and plug 104 combination that together with light source 102, create the look and effect of a recessed lighting fixture. Since the embodiment of socket 166 is generally similar to the embodiment of socket 106, the same reference numerals are used to designate similar or analogous components to avoid confusion. As is readily evident by comparing FIGS. 23-26 and 29-31 to FIGS. 1-10, length 120 of mounting strap 118 differs. For socket 106, the length is extended (i.e. much longer than the height of socket body 112), while for socket 166, the length is around the same size as the height of socket body 112, which is consistent with most of the sockets disclosed in the incorporated by reference patent documents.

Figure 27:
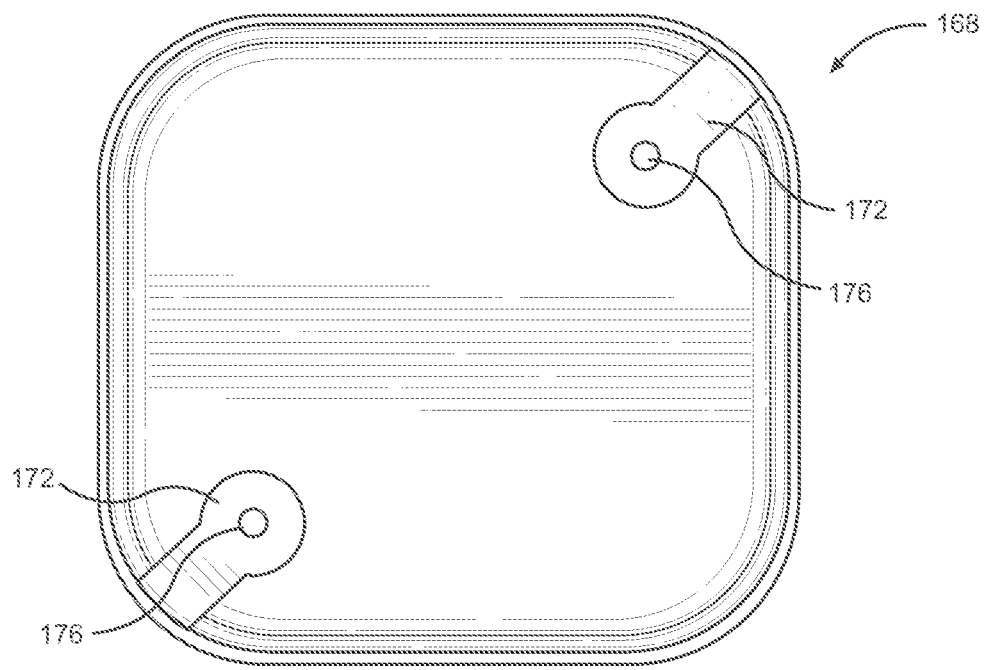
FIG. 27 is a front view of the electrical junction box of FIG. 23.
Figure 28:
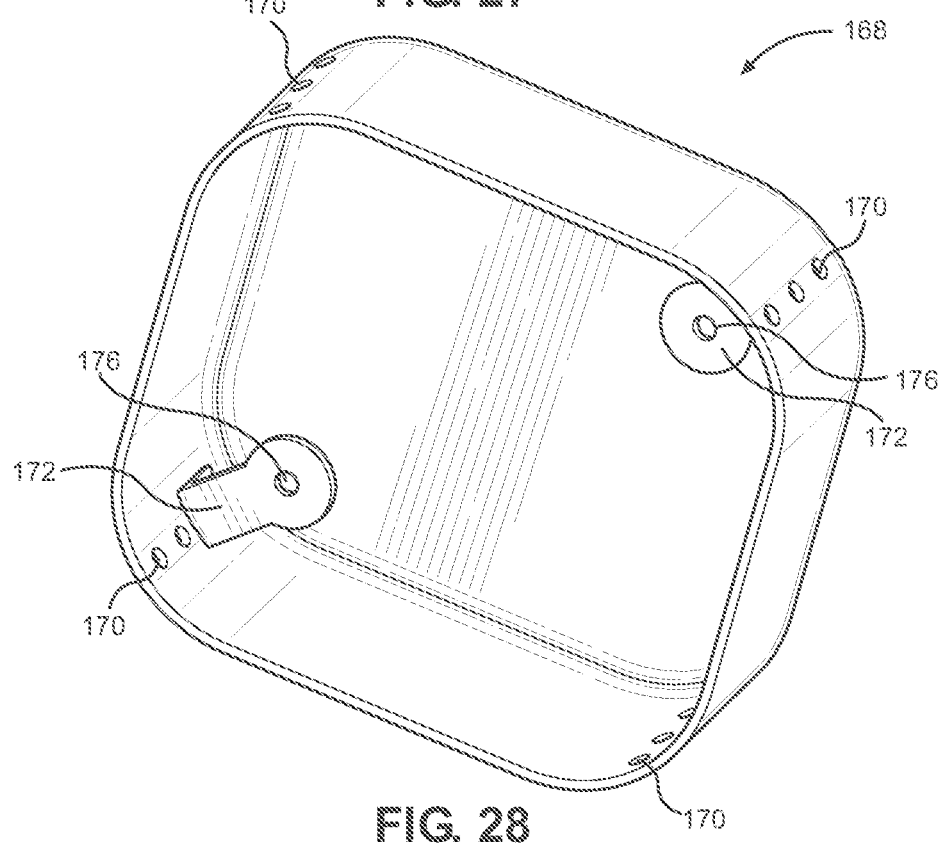
FIG. 28 is a perspective view of the electrical junction box of FIG. 23.

For socket 166, the look and effect of a recessed lighting fixture is achieved in combination with an electrical junction box 168. As an initial matter, it should be noted that electrical junction box 168 can be made by modifying (either at the installation site of light source 102 or at a manufacturing facility) electrical junction box 108 or electrical junction box 168 can be custom made. Referring primarily to FIGS. 27 and 28, electrical junction box 168 has a series of vertically spaced holes 170 in each corner. Although holes 170 are shown in each corner, holes 170 may be provided in only two opposite corners. Further, holes 170 can be located away from the corner as long as there are at least two opposite (or facing) series of holes 170. The position and spacing of each of holes 170 is selected for a desired vertical position of plug 164 within electrical junction box 168.

A bracket 172 is fixed to a side (or one of the corners) of electrical junction box 168 and another bracket 172 is fixed opposite the first bracket. Machine screws 174 (which insert into one of holes 170) can be used to secure brackets 172 to electrical junction box 168. The disclosure contemplates other methods (such as those used to position a shelf in a cabinet) of securing brackets 172 so long as the brackets can be moved to different holes 170 if a different position is desired.

Figure 29:
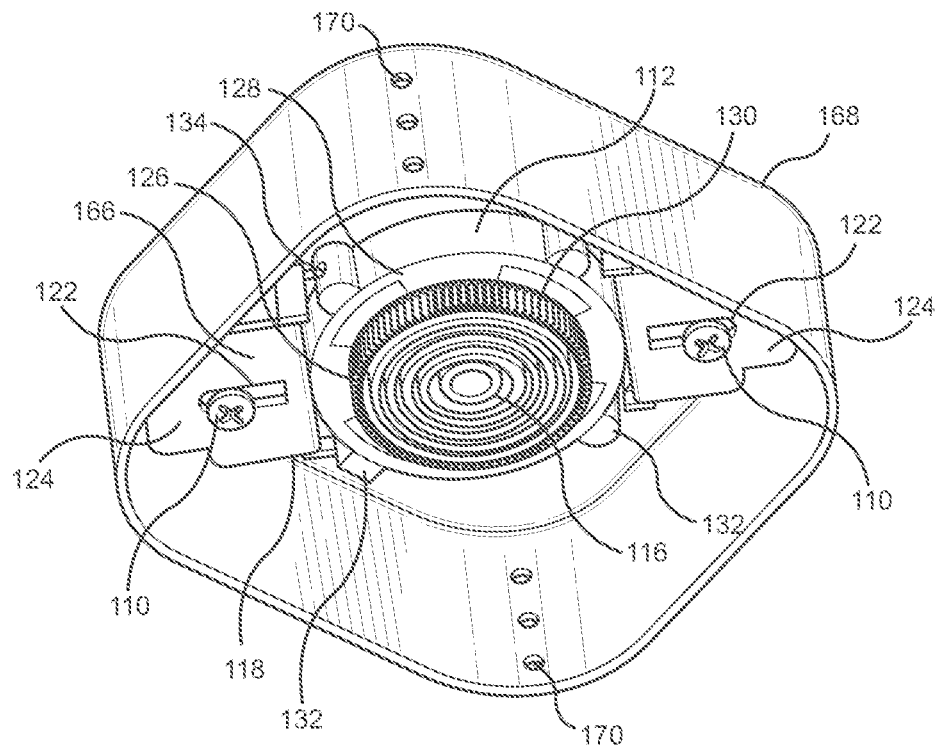
FIG. 29 is a perspective view of the socket installed in the electrical junction box of FIG. 23.
Figure 30:
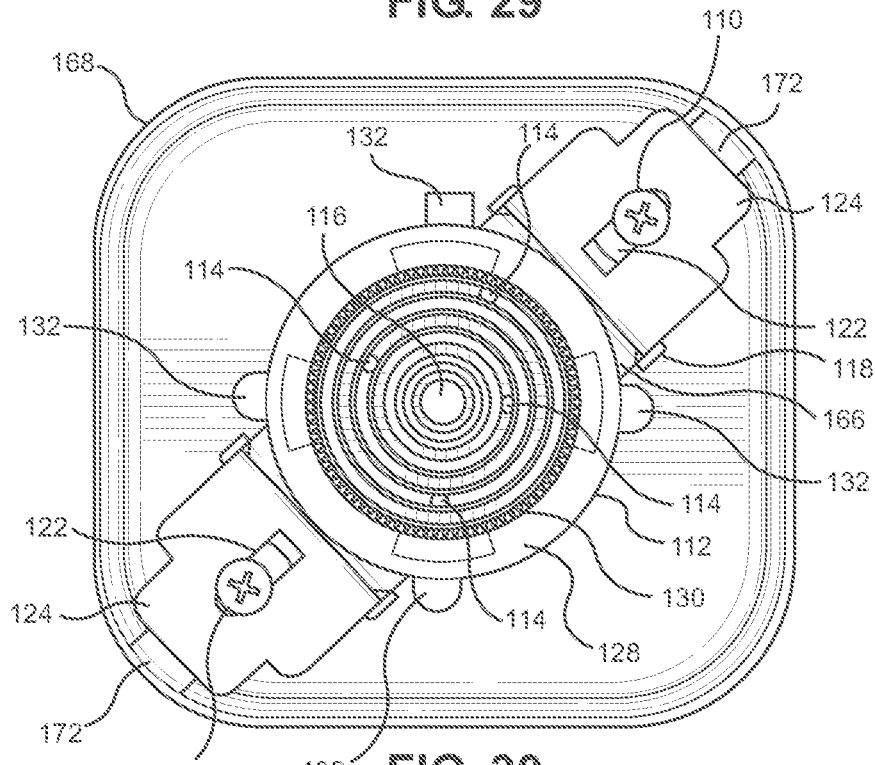
FIG. 30 is a top view of the socket installed in the electrical junction box of FIG. 23.
Figure 31:
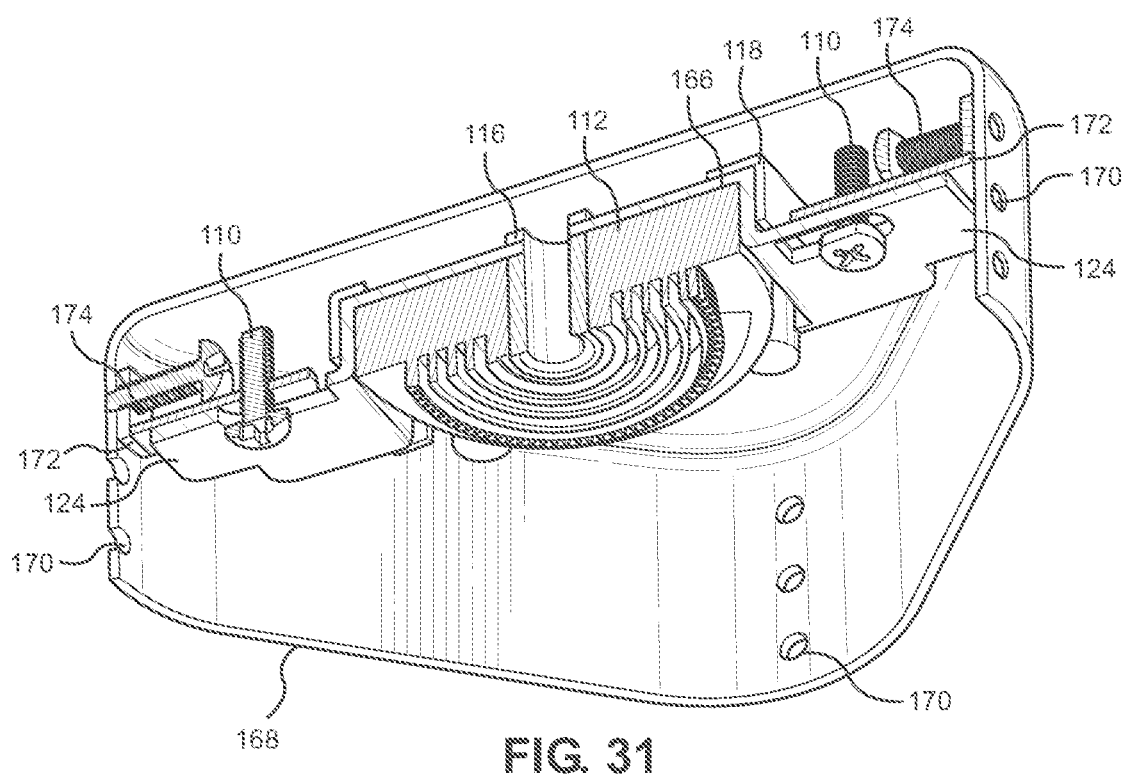
FIG. 31 is a sectional view of the socket installed in the electrical junction box of FIG. 23.

Bracket 172 includes a screw hole 176 for receiving screw 110, when socket 166 is positioned in electrical junction box 168, aperture 122 on flange 124 aligns with screw hole 176 to secure socket 166 to electrical junction box 168 (FIGS. 29-31). As previously noted, the specific hole 170 used is determined so that when plug 104 is coupled to socket 166, light source 102 provides the look and effect of a recessed lighting fixture.

Figure 32:
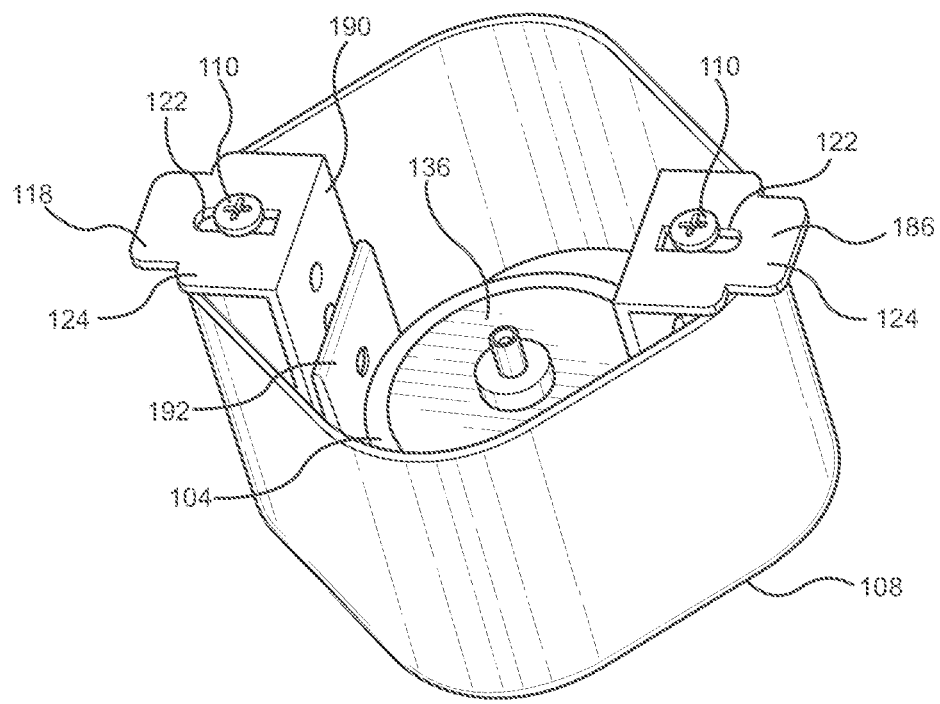
FIG. 32 is a perspective view of another embodiment of a socket installed in an electrical junction box.
Figure 33:
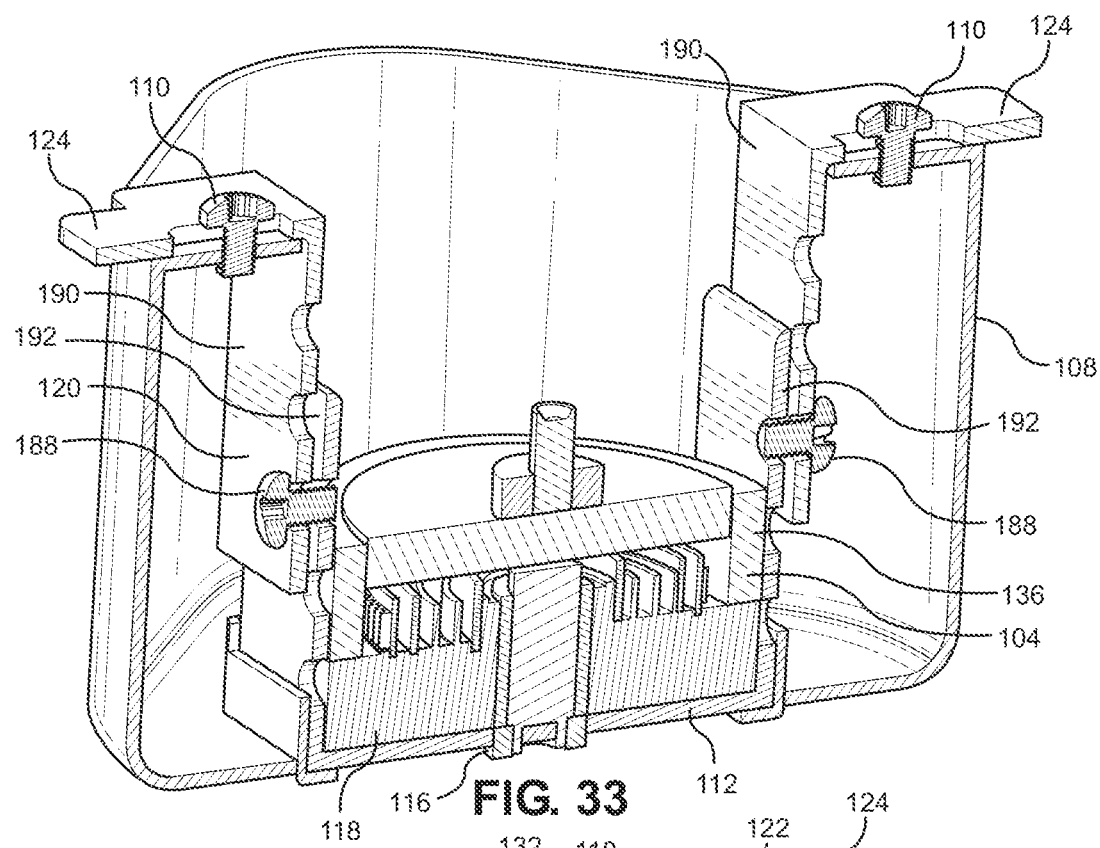
FIG. 33 is a sectional view of the socket of FIG. 32 installed in the electrical junction box.
Figure 34:
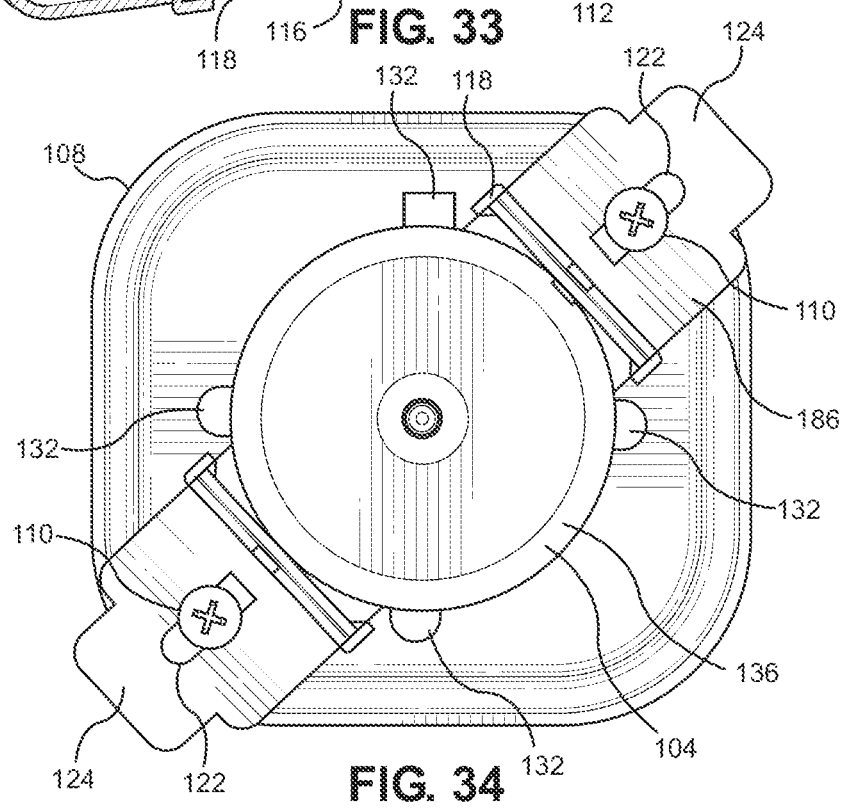
FIG. 34 is a front view of the socket of FIG. 32 installed in the electrical junction box.
Figure 36:
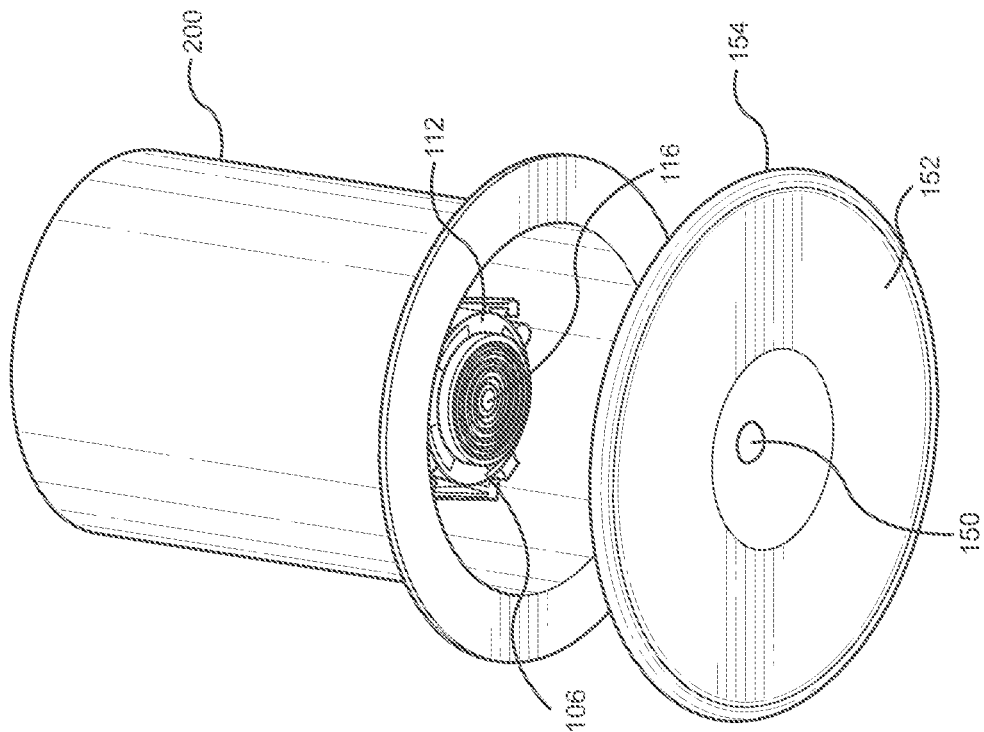
FIG. 36 is a perspective view of the plug and socket combination of FIG. 35 with the plug disconnected from the socket.
Figure 35:
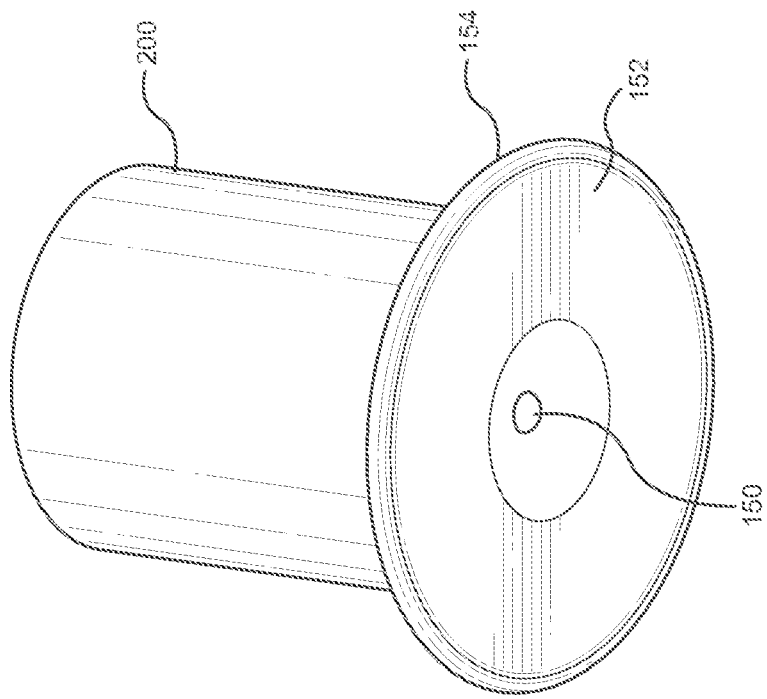
FIG. 35 is a perspective view of an embodiment of a plug and socket combination that can be used in an existing recessed lighting housing.
Figure 38:
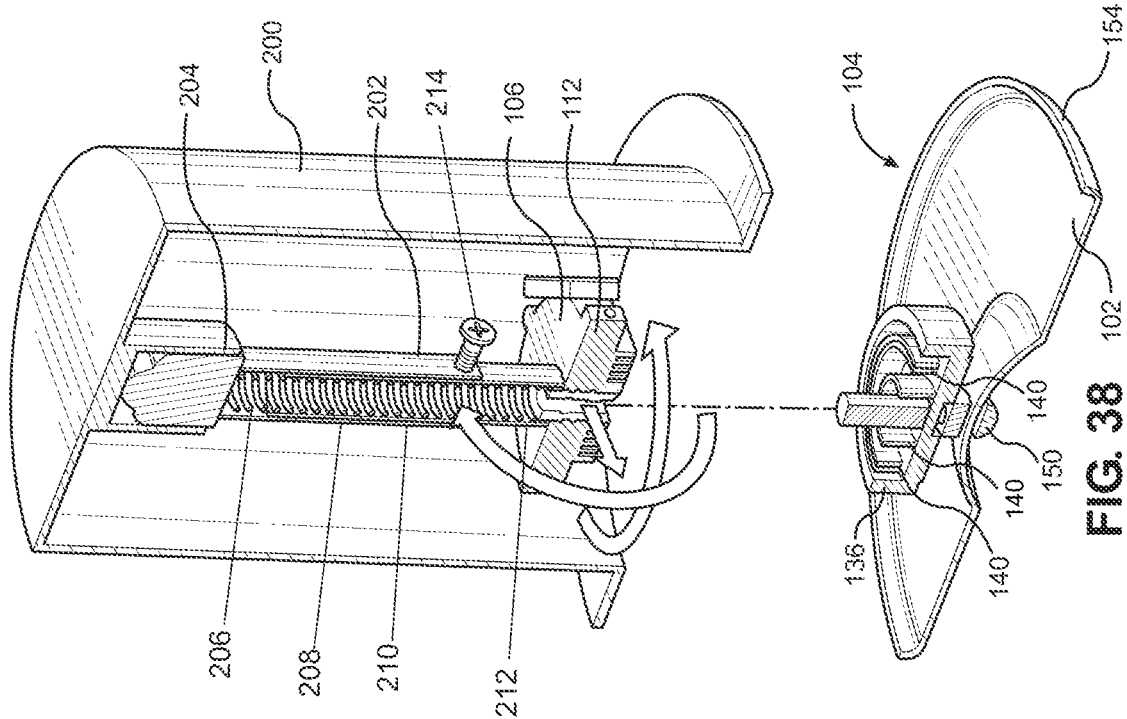
FIG. 38 is a sectional view of the plug and socket combination of FIG. 35 with the plug disconnected from the socket.
Figure 37:
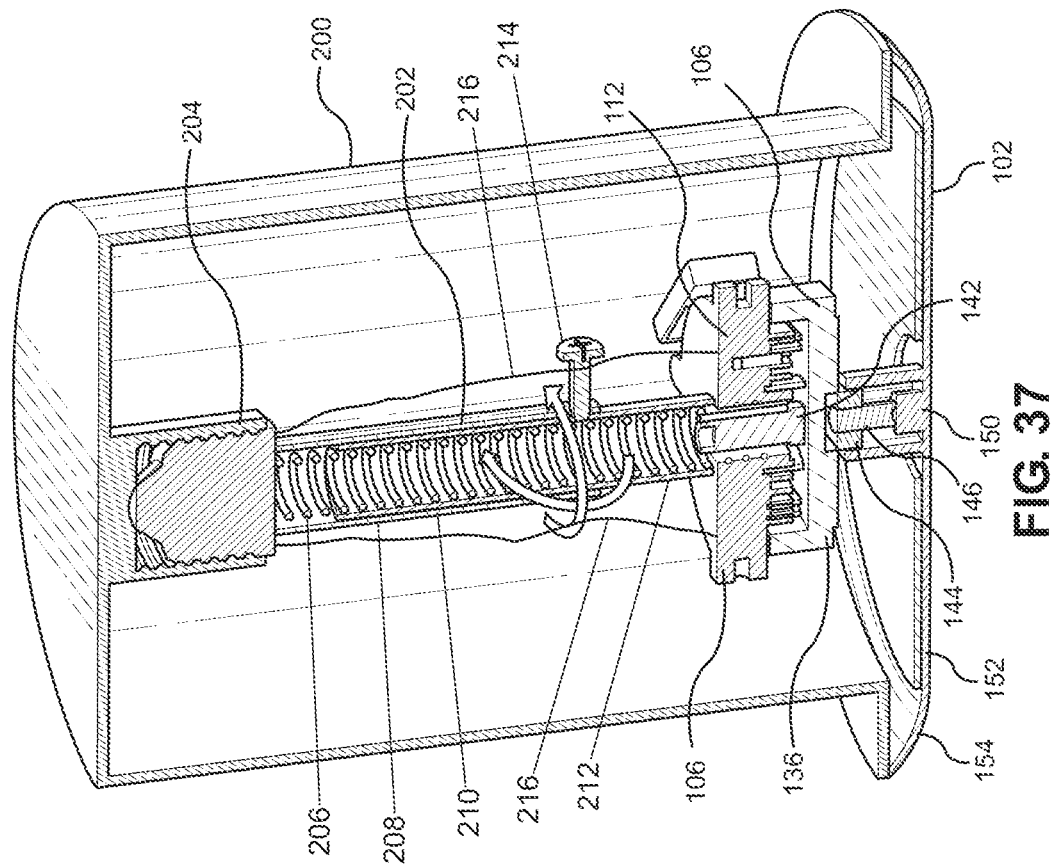
FIG. 37 is a sectional view of the plug and socket combination of FIG. 35.
Figure 39:
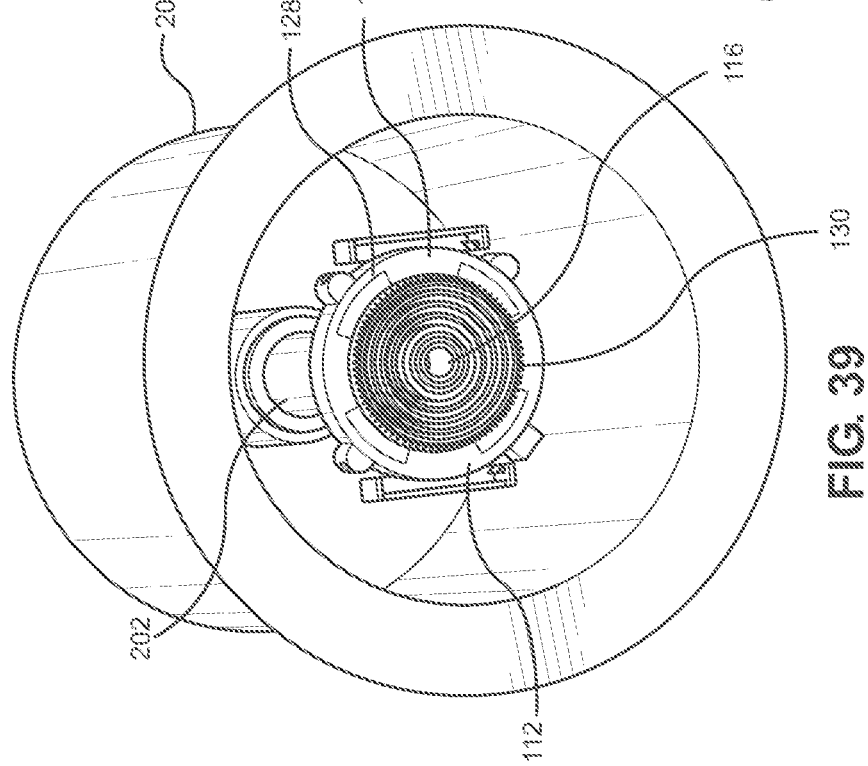
FIG. 39 is a front view of the socket of FIG. 35.
Figure 40:
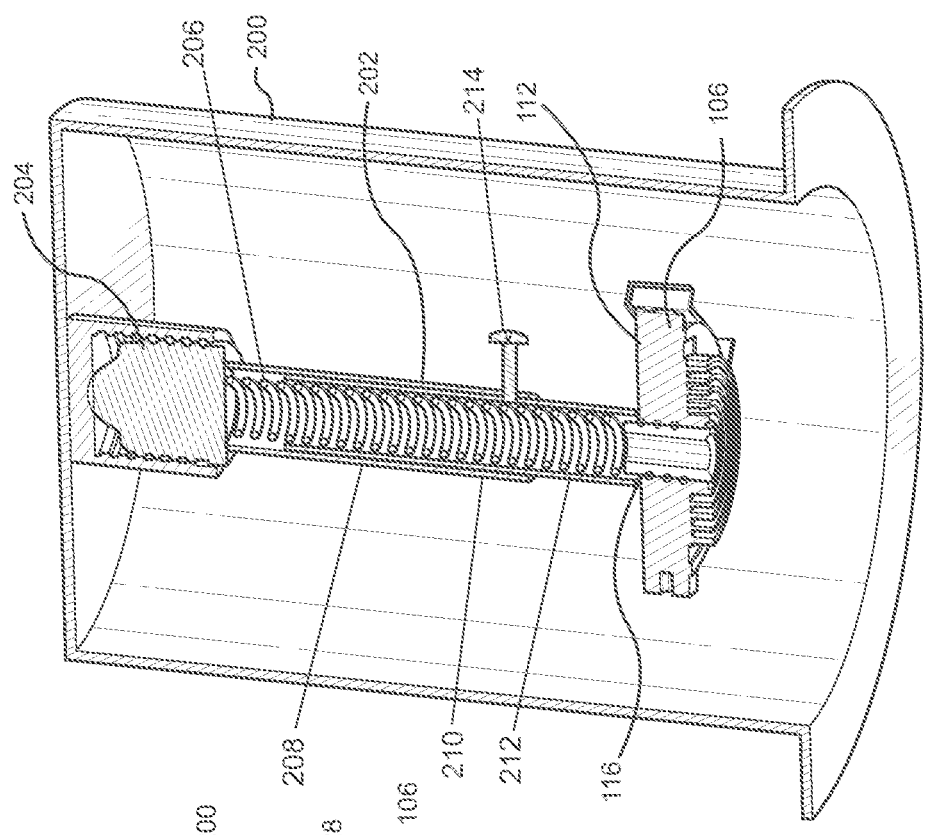
FIG. 40 is a sectional view of the socket of FIG. 35.

FIGS. 32-34 show another embodiment of a socket 186 and plug 104 combination that together with light source 102, create the look and effect of a recessed lighting fixture. Since the embodiment of socket 186 is generally similar to the previous disclosed embodiments of the socket, the same reference numerals are used to designate similar or analogous components to avoid confusion. Although electrical junction box 108 is shown (i.e. socket 186 is designed to be used with a standard electrical junction box), electrical junction box 168 can be used as well.

Socket 186 has a mounting strap 118 that has an adjustable length so that socket 186 can be positioned as deep or as shallow in electrical junction box 108 as is needed to achieve the look and effect of a recessed lighting fixture when plug 104 and lighting source 102 are coupled to socket 186. Although a particular mechanism for adjusting the length of mounting strap 118 (i.e. a set screw 188 to fix two legs 190, 192 at any one of a plurality of discrete positions), any suitable mechanism that provides an adjustable length (either in discrete positions or a continuum of positions) could be used.

FIGS. 35-40 show an embodiment of a plug and socket combination that can be used with an existing conventional recessed lighting housing 200. An extender 202 has an Edison type base 204 and screws into the threading 204 of housing 200. Extender 202 can have a fixed length or a variable length (as shown). Other mechanisms of changing the length of extender 202 are contemplated. Extender 202 is mechanically and electrically connected to socket 106. When plug 104 and lighting source 102 are attached, the look and effect of a recessed lighting fixture is achieved. This may be useful, for example, if regulations require a safety device, such as plug 104 and socket 106.

As shown in FIGS. 35-40, a spring 206 is located inside housing 208, which includes first and second telescoping portions 210, 212. Spring 206 biases extender 202 in an extended position and can be adjusted to a shorter length by screw 214. Wiring 216 (shown only in FIG. 37 for clarity) that conducts electricity from housing through Edison base 204 to socket 106 can be located outside of or within the space encircled by spring 206 or can be located inside spring 206 itself.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

What is claimed is:

1. A device for connecting an electrical fixture with electrical power supply wiring located at or near an electrical junction box positioned such that a face of the electrical junction box is substantially flush with a surface, and for mounting the fixture on the electrical junction box, the device comprising:
- a socket including a socket body having at least one internal cavity therein, the socket configured and dimensioned to be positioned in the electrical junction box and securable to the electrical junction box;
- an electrically conductive contact terminal disposed within the cavity for establishing an electrical connection between the electrical power supply wiring and the socket;
- a plug fixed to the fixture and insertable into the socket, the plug having at least one male connector electrically connected to the fixture and engageable with the contact terminal within the socket to establish a circuit between the electrical fixture and the electrical power wiring; and
- a releasable latch carried on the combination of the plug and the socket for releasably securing the plug to the socket,
- wherein the plug and socket are configured and dimensioned such that the fixture is positioned against the surface without a recessed lighting housing.

2. The device of claim 1, wherein the fixture is a LED PCB light source.

3. The device of claim 2, wherein the LED PCB includes a cover.

4. The device of claim 3, wherein the cover includes a lens, filter, or other optical element to create a lighting effect.

5. The device of claim 3, wherein the light source and cover both have a flat profile.

6. The device of claim 3, wherein at least one of the light source and cover has a domed profile.

7. The device of claim 3, wherein the cover includes a rim.

8. The device of claim 7, wherein a body of the cover is transparent or translucent and the rim is opaque.

9. The device of claim 1, wherein the socket includes a mounting strap attached to the socket body for securing the socket to the electrical junction box.

10. The device of claim 9, wherein the mounting strap is generally U-shaped with two legs.

11. The device of claim 10, wherein the length of the legs is at least twice the height of the socket body.

12. The device of claim 10, wherein the length of the legs is adjustable.

13. The device of claim 10, wherein the length of the legs is about the same as the height of the socket body.

14. The device of claim 13, wherein the electrical junction box includes a first series of vertically spaced holes and a second series of vertically spaced holes, with the first and second series of vertically spaced holes on facing surfaces of the electrical junction box.

15. A plug for coupling with a socket to form a device for connecting an electrical fixture with electrical power supply wiring located at or near an electrical junction box positioned such that a face of the electrical junction box is substantially flush with a surface, and for mounting the fixture on the electrical junction box, the plug comprising:
- at least one male connector electrically connected to the fixture and engageable with a contact terminal within the socket to establish a circuit between the electrical fixture and the electrical power wiring; and
- a releasable latch carried on the combination of the plug and the socket for releasably mounting the fixture on the support,
- wherein the plug and socket are configured and dimensioned such that the fixture is positioned against the surface without a recessed lighting housing.

16. A socket for a recessed lighting housing to mechanically and electrically couple an electrical fixture fixed to a plug, the socket comprising:
- an extender having an Edison type base on a first end and a socket body on a second end, the Edison type base threadably connectable to threading of housing to mechanically and electrical couple the socket to the housing;
- a socket body on a second end of the extender, the socket body having at least one internal cavity therein and an electrically conductive contact terminal disposed within the cavity for establishing an electrical connection between the housing and the socket; and
- a releasable latch carried on the combination of the plug and the socket for releasably securing the plug to the socket.

17. The socket of claim 16, wherein the extender has a fixed length.

18. The socket of claim 16, wherein the extender has an adjustable length.

* * * * *